(12) United States Patent
McCabe et al.

(10) Patent No.: US 7,030,809 B2
(45) Date of Patent: Apr. 18, 2006

(54) MULTIPLE MODEL RADAR TRACKING FILTER AND SYSTEMS AND METHODS EMPLOYING SAME

(75) Inventors: D. Hugh McCabe, Fredericksburg, VA (US); A. Sunshine Smith-Carroll, Spotsylvania, VA (US)

(73) Assignee: The United States of America as representd by the Secretary of the Navy, Washington, DC (US)

( * ) Notice: Subject to any disclaimer, the term of this patent is extended or adjusted under 35 U.S.C. 154(b) by 224 days.

(21) Appl. No.: 10/716,978

(22) Filed: Nov. 14, 2003

(65) Prior Publication Data

US 2005/0128138 A1   Jun. 16, 2005

(51) Int. Cl.
*G01S 13/72* (2006.01)

(52) U.S. Cl. .......................... 342/195; 342/95; 342/96; 342/97

(58) Field of Classification Search ............... 342/195, 342/95, 96, 97
See application file for complete search history.

(56) References Cited

U.S. PATENT DOCUMENTS

| | | | |
|---|---|---|---|
| 4,954,837 A | 9/1990 | Baird et al. ................. | 342/458 |
| 5,325,098 A | 6/1994 | Blair et al. .................... | 342/95 |
| 5,479,360 A | 12/1995 | Seif et al. | |
| 5,491,645 A | 2/1996 | Kennedy et al. | |
| 5,798,942 A | 8/1998 | Danchick et al. | |
| 5,842,156 A | 11/1998 | Hong et al. ................. | 702/179 |
| 5,999,117 A | 12/1999 | Engel .......................... | 342/95 |
| 6,829,568 B1 * | 12/2004 | Julier et al. ................. | 702/196 |
| 2002/0177951 A1 | 11/2002 | Syrjarinne .................. | 701/213 |
| 2005/0128138 A1 * | 6/2005 | McCabe et al. ............ | 342/195 |

* cited by examiner

*Primary Examiner*—Daniel Pihulic
(74) *Attorney, Agent, or Firm*—Gerhard W. Thielman, Esq.; Scott R. Boalick, Esq.; Matthew J. Bussan, Esq.

(57) ABSTRACT

A multiple model (MM) radar tracking filter which controls the weighting applied to outputs of first and second model functions responsive to non-Markovian switching logic, includes the first and second model functions, switching logic receiving unweighted outputs from the first and second model functions and generating first and second weighting signals, first and second multipliers generating respective first and second weighted output signals responsive to received ones of the unweighted outputs of the first and second model functions and the first and second weighting signals, and a feed back loop for providing a feedback signal to respective inputs of the first and second model functions responsive to the weighted outputs of the first and second multipliers. If desired, the MM radar tracking filter may also include a summer for generating a signal output responsive to the weighted outputs of the first and second multipliers. A method for controlling the MM radar tracking filter employing alternatives (non-Markov) switching logic is also described.

19 Claims, 22 Drawing Sheets

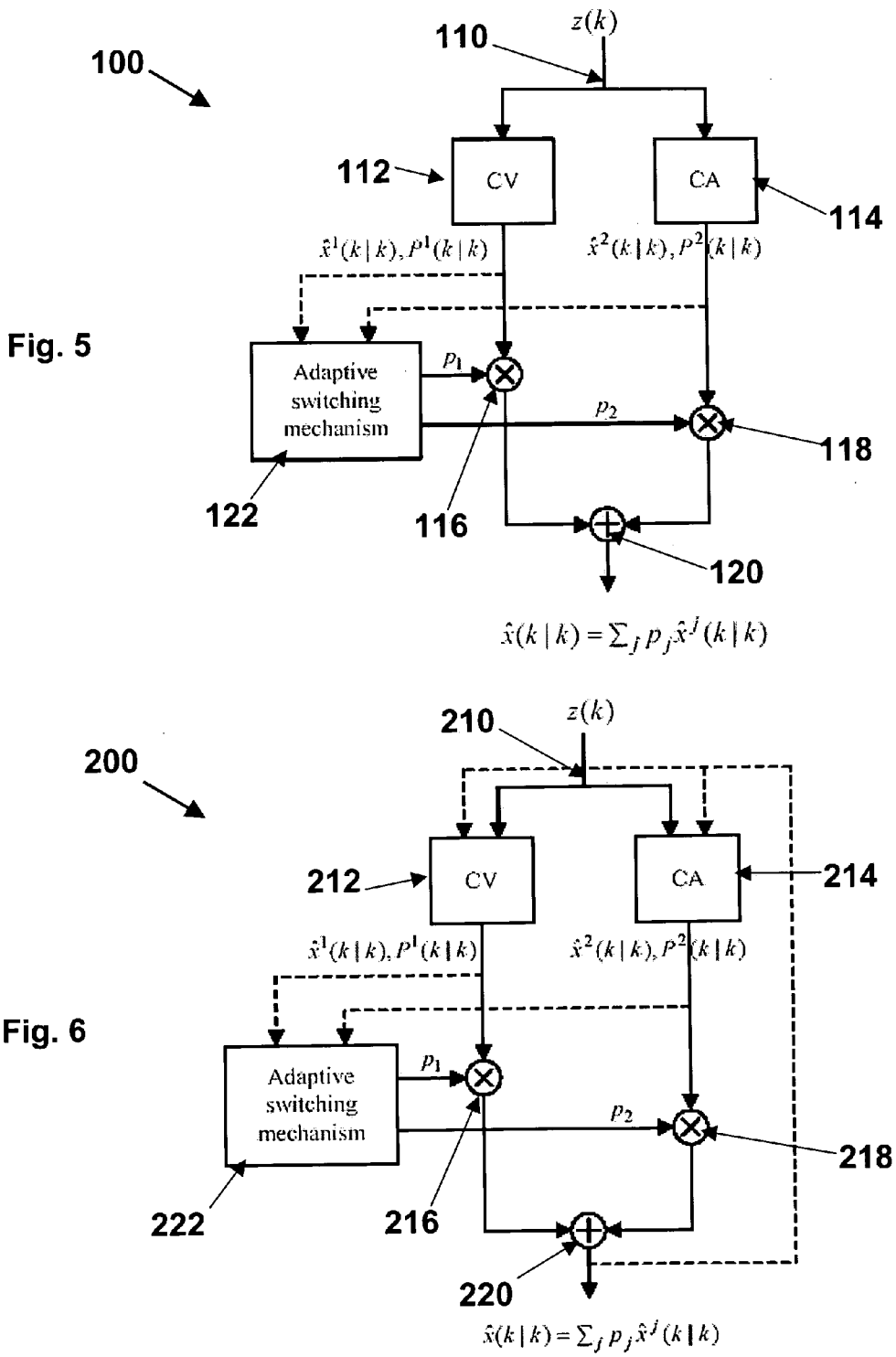

MULTIPLE MODEL RADAR TRACKING FILTER AND SYSTEMS AND METHODS EMPLOYING SAME

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to a multiple model (MM) radar tracking filter and, more specifically, to a MM radar tracking filter that does not employ a Markov Switching Matrix (MSM). A method for processing information received by a radar system is also disclosed.

Traditional multiple model (MM) radar tracking filter structures use Bayesian techniques to adaptively switch between different motion models implemented in the filter structure. These logic designs typically rely upon a pre-defined Markov Switching Matrix (MSM), whose entries are selected in a more or less ad hoc manner.

One of the striking features of all multiple model (MM) filter switching logic designs is that they invariably place reliance upon a predefined Markov Switching Matrix (MSM), Π, as illustrated in FIG. 1. This N×N matrix, where N equals the number of dynamic models in the filter bank, consists of switching probabilities, $p_{ij}$, for i, j=1 . . . N , having the following characteristics:
 1. The diagonal element, $p_{ij}$, represents the conditional probability that the system remains in state i during the next cycle given that it is currently in state i;
 2. The off diagonal element, $p_{ij}$, represents the conditional probability that the system will transition into state j during the next cycle given that it is currently in state i; and
 3. All the probabilities of a given row must sum to unity indicating that the system must either remain in the current state or transition to some other state.

No "optimum" method has been devised to populate the matrix, Π. While it is generally agreed that the diagonal values are "close to unity" and the off-diagonal elements are "small" subject to the constraint that the sum of all the elements of a row is unity, no specific rules have yet been devised for uniquely determining specific numerical values for a given tactical scenario. It is strictly up to each designer to select values using some ad hoc technique. When a set of values has been selected, numerous computer simulations are run and results compared with runs from other combinations of values. The set of values that produces the "best" results are then selected as the final design values. However, a set of values that may be "best" for one type of target may not be "best" for a different type of target. Thus, it is impossible to select a set of values that is "best" for all targets likely to be encountered.

The MSM has a very significant impact on how rapidly the switching mechanism detects and then responds to a maneuver by the target. A poorly selected set of values produces a sluggish filter response to a target maneuver. The reshuffling of the weights can be delayed if improper values are used in the MSM. As a result, significant filter lags develop, target tracks may be lost, and incorrect track correlations will follow.

What distinguishes a superior filter design from a poor filter design is the speed with which the switching logic detects and then responds to a target maneuver by reshuffling the weights to match the new target dynamic configuration. Since most MM filter designs incorporate a MSM as part of their switching logic, this matrix, whose values are selected in a generally ad hoc manner, has a significant impact on the response time of the switching logic to a sudden target maneuver. It will be appreciated that there is no "optimum" method for selecting values with which to populate this matrix. A set of values that may provide "good" tracking performance against a specific target type may not yield good track performance for a different target. Since one cannot know in advance what target type is going to be encountered in a given scenario, the filter designer is faced with a design dilemma.

In spite of this, the MM filter structure has won wide acceptance within the academic tracking community and system developers in other fields of endeavor. For example, U.S. Pat. No. 5,325,098 to Blair et al. discloses an interacting multiple bias model filter system for tracking and maneuvering targets. However, the system utilizes Markovian switching coefficients for its logic. Moreover, U.S. Pat. No. 5,479,360 to Seif et al. discloses a method of target passive ranging that does not require ownship to maneuver. In the latter patent, multiple Kalman filters feed a model probability update circuit. The function $p_{st}$ is an assumed Markov model transition or switching probability function whose value provides the probability of jumping or changing from model s at time K−1 to model t at time K. The values of the model transition probabilities are determined as part of the overall system design, analogously to the choice of values for the initial values of the predetermined model parameters.

Furthermore, U.S. Published App. No. 20020177951 to Syrjarinne discloses a two stage Interacting Multiple Model (IMM) for use in a global positioning system. More specifically, the '951 published application discloses a bank of predictive filters k, disposed in parallel, wherein estimates, covariance, and likelihood values are determined for each filter. As shown in FIG. 2 of the published application, the values are applied to a mixing unit and a combinational circuit. While the reference indicates that the outputs of the k Kalman filters are weighed, the weighting mechanism is not expressly defined. However, one of ordinary skill in the art will appreciate that the switching/weighting logic follows the MSM methodology.

Consequently, pressure is mounting to incorporate this filter structure into tactical tracking systems, e.g., radar tracking systems. Unfortunately, the ad hoc nature of selecting values for the MSM makes it difficult to predict, with any degree of certainty, what performance statistics can be anticipated for any given filter design. This represents a stumbling block for implementing these filters into tactical tracking systems.

What is needed is an alternative multiple model switching logic filter and operating method therefor that does not employ a Markov Switching Matrix.

SUMMARY OF THE INVENTION

Based on the above and foregoing, it can be appreciated that there presently exists a need in the art for a multiple model radar tracking filter that overcomes the above-described deficiencies. The present invention was motivated by a desire to overcome the drawbacks and shortcomings of the presently available technology, and thereby fulfill this need in the art.

In one aspect, the present invention provides a multiple model (MM) radar tracking filter which controls the weighting applied to outputs of first and second model functions responsive to non-Markovian switching logic. If desired, the MM radar tracking filter can include a feed back loop for providing a feedback signal to respective inputs of the first and second model functions responsive to the weighted outputs of the first and second model functions. It may also be desirable to include switching logic receiving unweighted outputs from the first and second model functions and generating first and second weighting signals, and first and second multipliers generating respective first and second weighted output signals responsive to received ones of the unweighted outputs of the first and second model functions and the first and second weighting signals.

In an exemplary case, the feedback loop provides a feedback signal based on a weighted estimate produced by the MM radar tracking filter. Alternatively, the feedback loop provides a feedback signal based on a convex sum of a weighted estimate produced by the MM radar tracking filter or a feedback signal based on a convex sum of a weighted estimate and a weighted covariance produced by the MM radar tracking filter.

In another aspect, the present invention provides a multiple model (MM) radar tracking filter which controls the weighting applied to outputs of first and second model functions responsive to non-Markovian switching logic, including the first and second model functions, switching logic receiving unweighted outputs from the first and second model functions and generating first and second weighting signals, first and second multipliers generating respective first and second weighted output signals responsive to received ones of the unweighted outputs of the first and second model functions and the first and second weighting signals, and a feed back loop for providing a feedback signal to respective inputs of the first and second model functions responsive to the weighted outputs of the first and second multipliers. If desired, the MM radar tracking filter may also include a summer for generating a signal output responsive to the weighted outputs of the first and second multipliers.

According to a further aspect, the present invention provides a method for operating a multiple model (MM) radar tracking filter including first and second model functions, switching logic, first and second multipliers, and a summer, wherein the first and second multipliers receive unweighted outputs from the first and second model functions and first and second weighting signals from the switching logic, including steps for controlling the switching logic without the use of a Markov Switch Matrix (MSM) and responsive to the first and second unweighted outputs of the first and second model functions to thereby generate first and second weighting signals, applying the first and second weighting signals to the first and second multipliers to thereby generate the first and second weighted output signals, respectively, and combining the first and second weighted output signals at the summer to thereby generate a MM filtered output signal.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 4A is a high level block diagram of an interacting multiple model (IMM) filter employed in an alternative radar system while

FIG. 5 is a high level block diagram of a first preferred embodiment of the MM radar tracking filter according to the present invention;

FIG. 6 is a high level block diagram of a second preferred embodiment of the MM radar tracking filter according to the present invention;

FIG. 10A illustrates the root square error (RSE) for position, FIG. 10B illustrates the RSE for velocity, FIG. 10C illustrates the RSE for acceleration, and FIG. 10D depicts the number of times that the RSE for the first preferred embodiment according to the present invention depicted in FIG. 5 is less that the RSE for the IMM radar filter system shown in FIG. 4A;

FIG. 11A illustrates the RSE for position, FIG. 11B illustrates the RSE for velocity, FIG. 11C illustrates the RSE for acceleration, and FIG. 11D depicts the number of times that the RSE for the second preferred embodiment according to the present invention depicted in FIG. 6 is less that the RSE for the IMM radar filter system shown in FIG. 4A;

FIG. 12A illustrates the RSE for position, FIG. 12B illustrates the RSE for velocity, FIG. 12C illustrates the RSE for acceleration, and FIG. 12D depicts the number of times that the RSE for the third preferred embodiment according to the present invention depicted in FIG. 7 is less that the RSE for the IMM radar filter system shown in FIG. 4A;

FIG. 13A illustrates the RSE for position, FIG. 13B illustrates the RSE for velocity, FIG. 13C illustrates the RSE for acceleration, and FIG. 13D depicts the number of times that the RSE for the fourth preferred embodiment according to the present invention depicted in FIG. 8 is less that the RSE for the IMM radar filter system shown in FIG. 4A;

FIG. 14A illustrates the RSE for position, FIG. 14B illustrates the RSE for velocity, FIG. 14C illustrates the RSE for acceleration, and FIG. 14D depicts the number of times that the RSE for the first preferred embodiment according to the present invention depicted in FIG. 5 is less that the RSE for the IMM radar filter system shown in FIG. 4A;

FIG. 15A illustrates the RSE for position, FIG. 15B illustrates the RSE for velocity, FIG. 15C illustrates the RSE for acceleration, and FIG. 15D depicts the number of times that the RSE for the second preferred embodiment according to the present invention depicted in FIG. 6 is less that the RSE for the IMM radar filter system shown in FIG. 4A;

FIG. 16A illustrates the RSE for position, FIG. 16B illustrates the RSE for velocity, FIG. 16C illustrates the RSE for acceleration, and FIG. 16D depicts the number of times that the RSE for the third preferred embodiment according to the present invention depicted in FIG. 7 is less that the RSE for the IMM radar filter system shown in FIG. 4A;

FIG. 17A illustrates the RSE for position, FIG. 17B illustrates the RSE for velocity, FIG. 17C illustrates the RSE for acceleration, and FIG. 17D depicts the number of times that the RSE for the fourth preferred embodiment according to the present invention depicted in FIG. 8 is less that the RSE for the IMM radar filter system shown in FIG. 4A;

FIG. 18A illustrates the RSE for position, FIG. 18B illustrates the RSE for velocity, FIG. 18C illustrates the RSE for acceleration, and FIG. 18D depicts the number of times that the RSE for the fourth preferred embodiment according to the present invention depicted in FIG. 8 is less that the RSE for the IMM radar filter system shown in FIG. 4A;

FIG. 19A illustrates the RSE for position, FIG. 19B illustrates the RSE for velocity, FIG. 19C illustrates the RSE for acceleration, and FIG. 19D depicts the number of times that the RSE for the fourth preferred embodiment according to the present invention depicted in FIG. 8 is less that the RSE for the IMM radar filter system shown in FIG. 4A;

FIG. 20A illustrates the RSE for position, FIG. 20B illustrates the RSE for velocity, FIG. 20C illustrates the RSE for acceleration, and FIG. 20D depicts the number of times that the RSE for the fourth preferred embodiment according to the present invention depicted in FIG. 8 is less that the RSE for the IMM radar filter system shown in FIG. 4A;

FIGS. 21A, 21B, 21C, and 12D collectively compare and contrast the performance of the radar filter systems depicted in FIGS. 4A and 8 for target 5, where FIG. 21A illustrates the RSE for position, FIG. 21B illustrates the RSE for velocity, FIG. 21C illustrates the RSE for acceleration.

DETAILED DESCRIPTION OF THE PREFERRED EMBODIMENTS

The present invention generally relates to a multiple model (MM) filter and devices incorporating same that do not employ a Markov Switching Matrix (MSM). Several exemplary embodiments of the MM radar tracking filler employing one or more alternative switching mechanisms (ASMs), i.e., alternative switching logic (ASL), according to the present invention are discussed in detail below. However, before describing the exemplary embodiments of the present invention in detail, a brief discussion will be presented contrasting a generic MM filter and systems employing same to a conventional Interacting Multiple Model (IMM) filter structure, i.e., a filter employing a MSM. Following the discussion of the preferred embodiments of the present invention, a comparison of the results achieved using the various exemplary embodiments of the MM radar tracking filter employing ASL with respect the corresponding results obtained with the more traditional IMM filter structure for six target models will be described.

Figure 1:
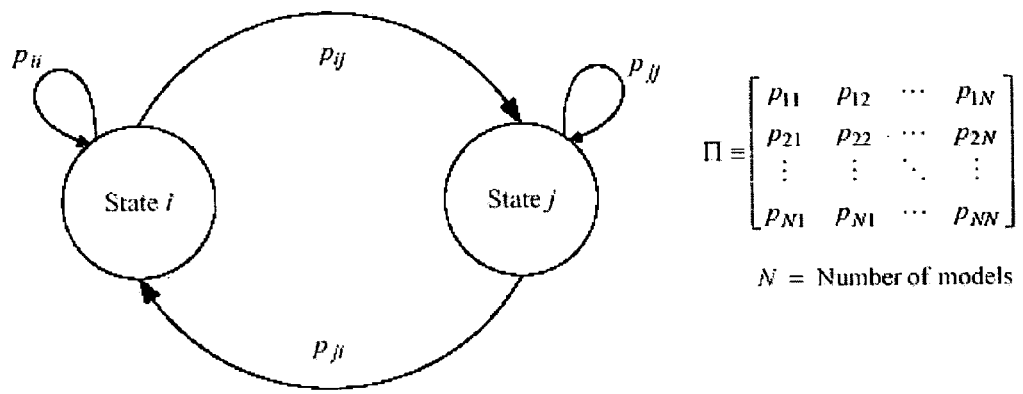
FIG. 1 illustrates the state diagram and corresponding matrix formulation for the Markov Switching Matrix (MSM) Π typically employed in the filters illustrated in FIGS. 3 or FIG. 4.
Figure 2:
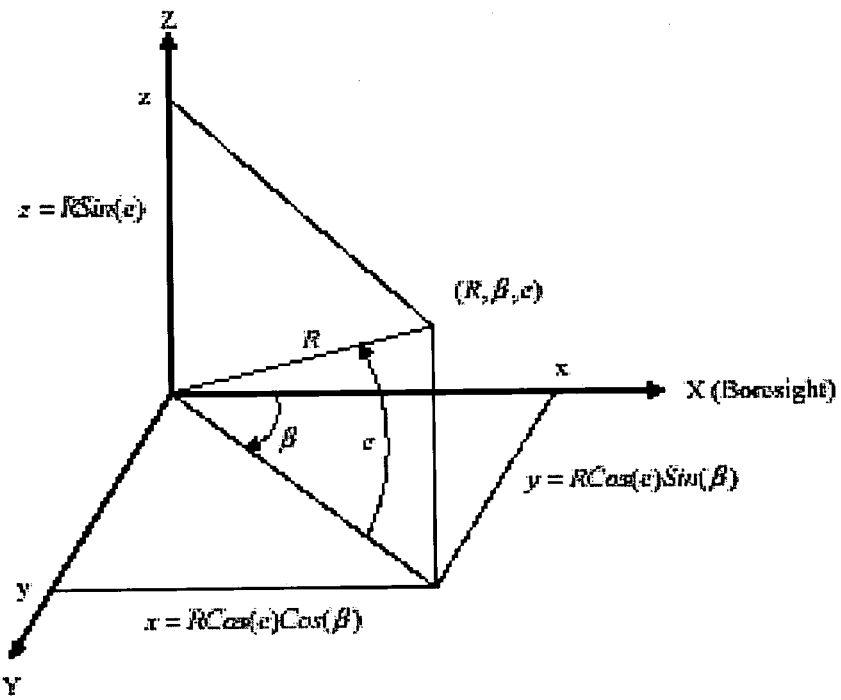
FIG. 2 illustrates the geometry employed in most radar systems.

By way of background, FIG. 2 illustrates the radar coordinate system employed in describing the operation of the MM filter according to the present invention. It will be appreciated that noisy measurements are made in the R, $\beta$, and e domains, where R is the range measurement, $\beta$ is the bearing measurement, and e is the elevation measurement, respectively, with zero mean Gaussian noise being added in each domain. It will also be appreciated that, since tracking is performed in the Cartesian coordinate system, the spherical coordinate measurements illustrated in FIG. 1 must first be converted to Cartesian coordinates prior to input to the filter bank as measurement (target) vector $Z_k$, where $$Z_k = \begin{bmatrix} x_k \\ y_k \\ z_k \end{bmatrix} = \begin{bmatrix} R_k \cos\beta_k \cos e_k \\ R_k \sin\beta_k \cos e_k \\ R_k \sin e_k \end{bmatrix} \quad \text{Eq. 1}$$

It will be noted that, since measurements are input into the filter in Cartesian coordinates, a measurement noise covariance matrix needs to be calculated for this coordinate system. This is accomplished by determining the first order differential changes $\Delta x$, $\Delta y$, and $\Delta z$ in x, y, and z, respectively, arising from incremental errors in R, $\beta$, and e. Taking the first order partial derivative of each term in the following vector.

$$\begin{bmatrix} x_k \\ y_k \\ z_k \end{bmatrix} = \begin{bmatrix} R_k \cos\beta_k \cos e_k \\ R_k \sin\beta_k \cos e_k \\ R_k \sin e_k \end{bmatrix} \quad \text{Eq. 2}$$

yields (in matrix form)

$$\begin{bmatrix} \Delta x_k \\ \Delta y_k \\ \Delta z_k \end{bmatrix} = \quad \text{Eq. 3}$$

$$\begin{bmatrix} \cos\beta_k \cos e_k & -R_k \sin\beta_k \cos e_k & -R_k \cos\beta_k \sin e_k \\ \sin\beta_k \cos e_k & R_k \cos\beta_k \cos e_k & -R_k \sin\beta_k \sin e_k \\ \sin e_k & 0 & R_k \cos e_k \end{bmatrix} \begin{bmatrix} \Delta R_k \\ \Delta \beta_k \\ \Delta e_k \end{bmatrix}.$$

Defining $$A = \begin{bmatrix} \cos\beta_k \cos e_k & -R_k \sin\beta_k \cos e_k & -R_k \cos\beta_k \sin e_k \\ \sin\beta_k \cos e_k & R_k \cos\beta_k \cos e_k & -R_k \sin\beta_k \sin e_k \\ \sin e_k & 0 & R_k \cos e_k \end{bmatrix}, \quad \text{Eq. 4}$$

then:

$$\begin{bmatrix} \Delta x_k \\ \Delta y_k \\ \Delta z_k \end{bmatrix} = A \begin{bmatrix} \Delta R_k \\ \Delta \beta_k \\ \Delta e_k \end{bmatrix}. \quad \text{Eq. 5}$$

The mean value of the vector is $$E\left\{\begin{bmatrix} \Delta x_k \\ \Delta y_k \\ \Delta z_k \end{bmatrix}\right\} = A \cdot E\left\{\begin{bmatrix} \Delta R_k \\ \Delta \beta_k \\ \Delta e_k \end{bmatrix}\right\} = \begin{bmatrix} 0 \\ 0 \\ 0 \end{bmatrix}, \quad \text{Eq. 6}$$

because the measurement noise in R, β, and e has zero mean and, to a first order approximation, it is being assumed that the matrix A is a constant matrix, evaluated at the most recent estimated values for R, β, and e. Therefore, to the first-order approximation, the measurement covariance matrix, R, is given by $$R = A \begin{bmatrix} \sigma_R^2 & 0 & 0 \\ 0 & \sigma_\beta^2 & 0 \\ 0 & 0 & \sigma_e^2 \end{bmatrix} A^T. \quad \text{Eq. 7}$$

It will be noted that R is a nonlinear, time-varying covariance matrix whose elements need to be updated at each measurement time using the current estimates of R, β, and e.

It will be recognized that multiple model (MM) radar tracking filters yield superior performance for tracking maneuvering targets than single model filters. Consequently, a considerable effort has been expended over the past twenty five years to refine and develop improved multiple model tracking filters. One such MM filter is discussed below.

Figure 3:
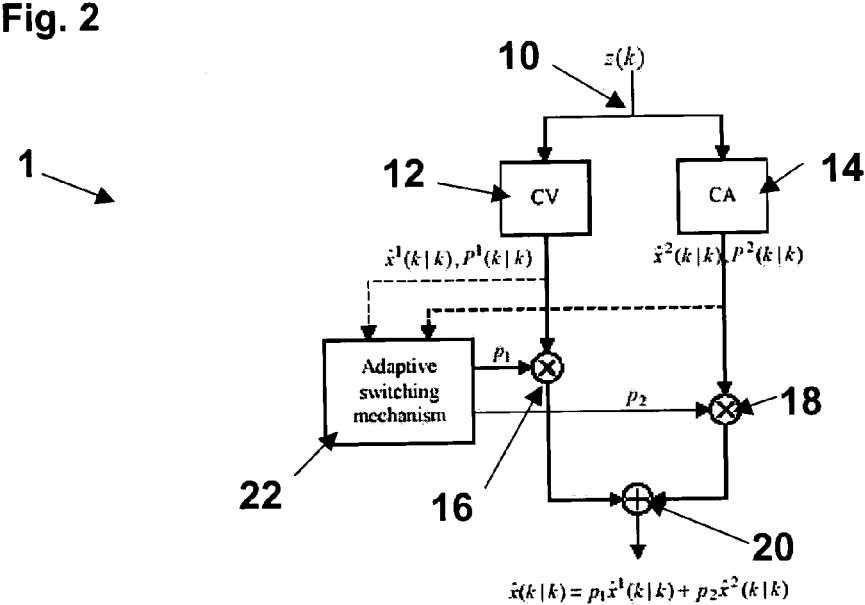
FIG. 3 is a high level functional block diagram of an exemplary Multiple Model (MM) filter employed in a radar system.

FIG. 3 is a high level functional block diagram of a exemplary Multiple Model (MM) filter employed in a radar system. Stated another way, the essential functions of a most basic multiple model filter design are illustrated in FIG. 3, which depicts a parallel bank of two dynamic motion model filters. Each model in the filter bank represents a different possible type of target motion. More specifically, the MM radar tracking filter 1 includes a splitter 10, a constant velocity (CV) filter function 12, and a constant acceleration (CA) filter function 14, the outputs of which are collected and output via a summer function 20. It will be appreciated that the MM filter 1 includes an adaptive switch mechanism (ASM) function 22, which receives signals (data) from the filter functions 12 and 14 and which outputs weighting signals (control data) to multiplier functions 16 and 18 disposed between the filter functions 12 and 14, respectively, and the summer function 20.

In FIG. 3, the CV motion model filter function 12 advantageously can be a first Kalman filter while the CA motion model filter function 14 advantageously can be implemented as a second Kalman filter. It will be appreciated that this overall filter architecture models the range of possible target motion as consisting of either constant velocity or constant acceleration. In other words, the CV model assumes that the target is moving in a straight line without any maneuver while the CA model assumes that the target is undergoing an acceleration in one or more coordinate directions.

The state vector of the CV model is given by $$X_k = \begin{bmatrix} x_k \\ \dot{x}_k \\ y_k \\ \dot{y}_k \\ z_k \\ \dot{z}_k \end{bmatrix} \quad \text{Eq. 8}$$

while the state equation that describes the CV model is given by $$X_{k+1} = \phi_k X_k + w_k \quad \text{Eq. 9}$$

and the measurement equation is given by $$Z_k = H X_k + v_k. \quad \text{Eq. 10}$$

The state transition matrix for the CV model is defined as $$\phi_k = \begin{bmatrix} A & B & B \\ B & A & B \\ B & B & A \end{bmatrix} \quad \text{Eq. 11}$$

where $$A = \begin{bmatrix} 1 & T \\ 0 & 1 \end{bmatrix} \quad \text{Eq. 12}$$

(T=sample interval) and $$B = 0_{2 \times 2} \quad \text{Eq. 13}$$

It will be noted that the (6×1) process noise vector $w_k$ has a block diagonal covariance matrix giver by $Q_{CV}$. H is defined as the standard measurement matrix $$H = \begin{bmatrix} 1 & 0 & 0 & 0 & 0 & 0 \\ 0 & 0 & 1 & 0 & 0 & 0 \\ 0 & 0 & 0 & 0 & 1 & 0 \end{bmatrix}. \quad \text{Eq. 14}$$

In contrast, the state vector of the CA model is given by $$X_k = \begin{bmatrix} x_k \\ \dot{x}_k \\ \ddot{x}_k \\ y_k \\ \dot{y}_k \\ \ddot{y}_k \\ z_k \\ \dot{z}_k \\ \ddot{z}_k \end{bmatrix} \quad \text{Eq. 15}$$

while the state equation that describes the CA model is given by $$X_{k+1} = \phi_k X_k + w_k \quad \text{Eq. 16}$$

and the measurement equation is expressed as $$Z_k = H X_k + \upsilon_k. \quad \text{Eq. 17}$$

The state transition matrix for the CA model is defined as $$\phi_k = \begin{bmatrix} S & B & B \\ B & S & B \\ B & B & S \end{bmatrix} \quad \text{Eq. 18}$$

where $$S = \begin{bmatrix} 1 & T & \frac{1}{2}T^2 \\ 0 & 1 & T \\ 0 & 0 & 1 \end{bmatrix} \quad \text{Eq. 19}$$

(T=sample interval) and $$B = 0_{3 \times 3} \quad \text{Eq. 20}$$

For the CA model, the (9×1) process noise vector $w_k$ has a block diagonal covariance matrix given by $Q_{CA}$. H is defined as the standard measurement matrix $$H = \begin{bmatrix} 1 & 0 & 0 & 0 & 0 & 0 & 0 & 0 & 0 \\ 0 & 0 & 0 & 1 & 0 & 0 & 0 & 0 & 0 \\ 0 & 0 & 0 & 0 & 0 & 0 & 1 & 0 & 0 \end{bmatrix}. \quad \text{Eq. 21}$$

It will be appreciated that the CV model is initialized using the initial measurements $Z_1$ and $Z_2$ and stored in $X_1$ in the following manner:

$$Z_1 = \begin{bmatrix} x_1 \\ y_1 \\ z_1 \end{bmatrix} \text{ and } Z_2 = \begin{bmatrix} x_2 \\ y_2 \\ z_2 \end{bmatrix} \quad \text{Eq. 22}$$

$$X_1 = \begin{bmatrix} x_2 \\ \dfrac{x_2 - x_1}{T} \\ y_2 \\ \dfrac{y_2 - y_1}{T} \\ z_2 \\ \dfrac{z_2 - z_1}{T} \end{bmatrix} \quad \text{Eq. 23}$$

and the error covariance is initialized to the following $$P_1 = \text{diag}[5000 \ 2000 \ 5000 \ 2000 \ 5000 \ 2000] \quad \text{Eq. 24}$$

In contrast, the CA model is initialized using the initial measurements $Z_1$ and $Z_2$ and stored in $X_1$ in the following manner $$X_1 = \begin{bmatrix} x_2 \\ \dfrac{x_2 - x_1}{T} \\ 0 \\ y_2 \\ \dfrac{y_2 - y_1}{T} \\ 0 \\ z_2 \\ \dfrac{z_2 - z_1}{T} \\ 0 \end{bmatrix} \quad \text{Eq. 25}$$

and the error covariance matrix is initialized to the following $$P_1 = \text{diag}[5000 \ 2000 \ 4000 \ 5000 \ 2000 \ 4000 \ 5000 \ 2000 \ 4000] \quad \text{Eq. 26}$$

It should be mentioned at this point that a related, but quite distinct, dynamic motion model, i.e., a constant speed motion (CS) model, advantageously can be employed in the MM radar tracking filter 1. The CS model assumes that the target is undergoing circular motion with a constant tangential speed. While the dynamics of a CV and CA model do not vary with time, a CS model has a complex mathematical representation requiring an update of the current angular turning rate estimate at each time instant. In order to simplify the MM filter as much as possible, the MM filter illustrated in FIG. 3 employs the CA motion model to model all motion other than CV, including constant speed motion.

It should also be mentioned that the ASM function 16 in FIG. 3 represents the logic that, at each measurement instant, determines which motion model best models the target's current dynamic profile. Based on output estimate vectors and covariance matrices from the two Kalman filter motion models, i.e., filter functions 12 and 14, the switching logic computes two weights ($p_1$, $p_2$) where $p_i$ is the probability that motion model i is matched to the current target motion. These two weights are used to compute the "optimal" output estimate vector $\hat{x}(k|k) = p_1 \ \hat{x}^1(k|k) + p_2 \ \hat{x}^2(k|k)$. Thus, for example, when the target is executing CV motion, it would be expected that the CV filter weight $p_1$ would be near unity while the CA filter weight $p_2$ would be close to zero. When the target suddenly starts maneuvering, the weights need to be reshuffled with the CA filter weight, $p_2$, rapidly increasing to a value near unity with the CV weight, $p_1$, rapidly decreasing to a value close to zero to reflect the new target dynamic configuration.

The goal of the switching logic is to always place the heaviest weight on the model that is most closely matched to the true target dynamic configuration at any given time instant and to place minimum weight on the other(s). As the target executes different types of motion, the switching logic must detect the changes in target behavior reflected in the data measurement stream and constantly reshuffle the weights as the evolving trajectory dictates. Detection of the new configuration and the subsequent reshuffling of the weights must be accomplished in a minimum amount of time to minimize lags in the estimates and the potential loss of track.

As mentioned above, what distinguishes a good filter design from a poor filter design is the speed with which the switching logic detects and then responds to a maneuver by reshuffling the weights to match the new target dynamic configuration. Most MM radar tracking filter designs incorporate a Markov Switching Matrix (MSM) as part of their switching logic. This matrix, whose values are selected in a generally ad hoc manner, has a significant impact on the response time of the switching logic to a sudden target maneuver. No "optimum" method exists for selecting values with which to populate this matrix. A set of values that may provide a "good" tracking performance against a specific target type may not yield a "good" performance against a different target type. Since one can not know in advance what target type is going to be encountered in a given scenario, the filter designer is faced with a design dilemma.

In spite of this, the MM radar tracking filter structure enjoys wide acceptance within the academic tracking community. Consequently, pressure is mounting to incorporate this filter structure into tactical tracking systems. Unfortunately, the ad hoc nature of selecting values for the MSM makes it difficult to predict with any degree of certainty what performance statistics can be anticipated for a given filter design. This presents a stumbling block for implementing these MM filters into tactical tracking systems.

As will be discussed in greater detail below, the exemplary embodiments of the present invention provide alternative switching mechanisms for multiple model filters that do not require a MSM for their switching logic. It will be noted that the exemplary embodiments do not represent an exhaustive listing of the possible MM radar tracking filter architectures. Many additional approaches beyond those discussed below are likely to occur to one of ordinary skill in the art and all such variations and alternatives are believed to fall within the scope of the present invention. Moreover, it is expected that the discussion of the preferred embodiments according to the present invention advantageously will generate interest in, and provide a motivation for, further research into non-Markov logic applied to MM radar tracking filter design, which has been bereft of attention up to this point.

The Interacting Multiple Model (IMM) filter is one notable example of a MM filter that relies upon a MSM for its operation. This filter has been widely hailed as a significant advance in the domain of tracking filters. This filter will be employed as the standard for comparing the MM radar tracking filters including Alternative Switching Logic (ASL), which do not rely on a precomputed MSM, of the exemplary embodiments according to the present invention.

In contrast, the MM radar tracking filter employing ASL, i.e., Non-Markov switching logic, by removing the MSM from the design, remove a degree of uncertainty and arbitrariness from the design, which, in turn, makes the MM radar tracking filter more acceptable as a candidate for implementation in real-world tactical systems. However, before discussing ASL designs, it is necessary to review the underlying principles of track filtering including CV and CA motion models (see the discussion above) and the IMM radar tracking filter 50 illustrated in FIG. 4A.

Figure 4A:
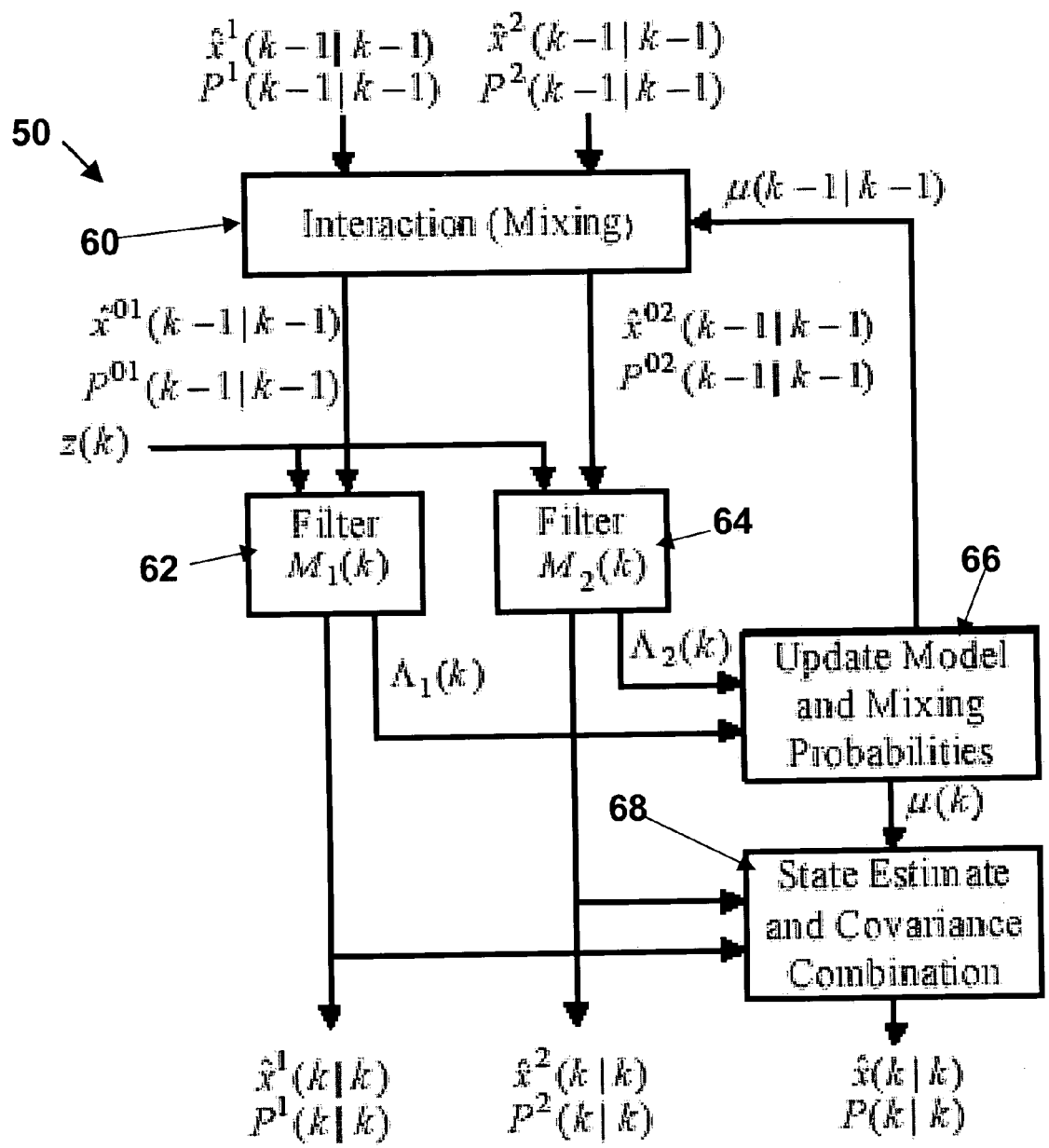

FIG. 4A is a high level block diagram of an interacting multiple model (IMM) filter employed in a conventional radar tracking system, which includes several so-called Kalman filters. In general, the Kalman filter is an optimal state estimator for single mode systems, provided that an exact motion model for the target dynamics is available. Many experimenters have tried to broaden the Kalman filter to provide optimal state estimates for multiple mode systems, i.e., maneuvering targets. The IMM algorithm implemented in the IMM radar tracking filter depicted in FIG. 4A was designed to allow increased accuracy while tracking a maneuvering target. The IMM algorithm allows two or more single mode system filters to run in parallel. Typically, constant velocity, constant acceleration, and constant turning rate (speed) filters are all employed in conjunction with an IMM algorithm. The implementation fo the IMM algorithm shown in FIG. 4A employs two models rather than three.

Still referring to FIG. 4A, the IMM radar tracking filter 50 includes structure implementing a interaction (mixing) function 60, producing first and second output signals applied to first and second filter functions 62 and 64, respectively. Selected outputs of the filter functions 62 and 64 are applied to corresponding inputs to a model and mixing probabilities updating function 66, which produces two outputs. One output is applied to the interaction function 60 while the other output is applied to a state estimate and covariance combination calculator function 68. It will be appreciated that the calculator function also receives inputs from the first and second filters 62, 64.

The operation of the IMM radar tracking filter, as well as the interaction between the equations collectively defining the IMM algorithm for tracking with N dynamic motion models are set forth in below and illustrated in FIG. 4B.

Figure 4B:
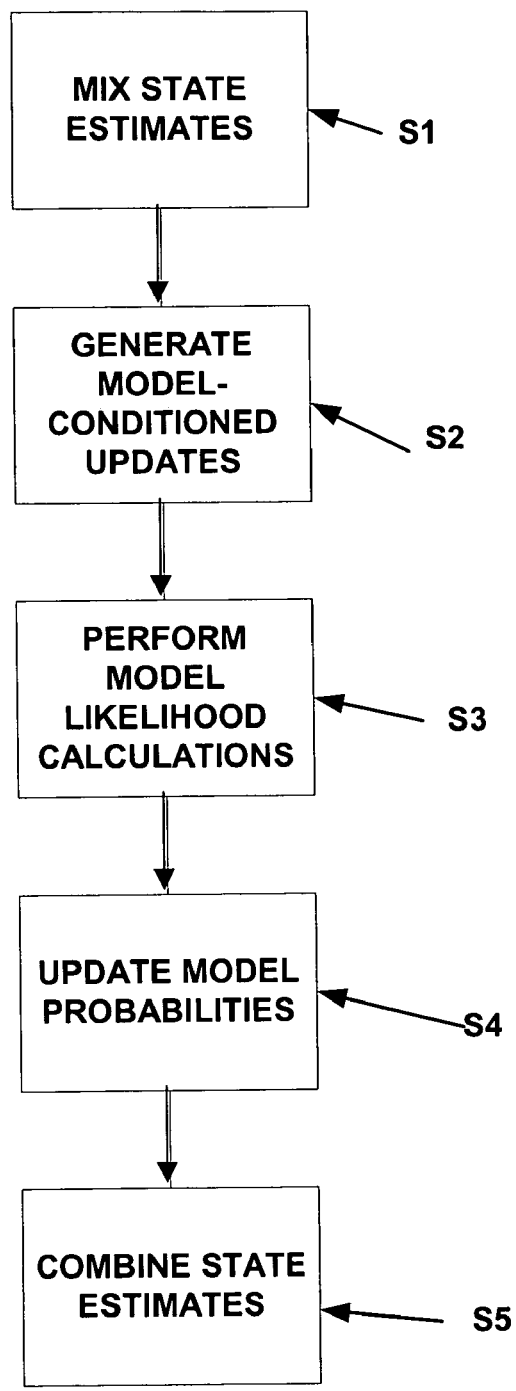
FIG. 4B illustrates the method by which the IMM filter is operated.

Referring to FIG. 4B, during step S1, the state estimates employed in the IMM algorithm are mixed. More specifically, the filtering process starts with prior state estimates $X_{k-1|k-1}^j$, state error covariances $P_{k-1|k-1}^j$, and the associated probabilities $\mu_{k-1}^j$ for each model. The mixed state estimate for $M_k^j$, $P_{k-1|k-1}^{0j}$, is computed as $$X_{k-1|k-1}^{0j} = \sum_{i=1}^{N} X_{k-1|k-1}^i \mu_{k-1|k-1}^{i|j} \qquad \text{Eq. 27}$$

where $$\mu_{k-1|k-1}^{i|j} = \frac{1}{\bar{c}_j} p_{ij} \mu_{k-1}^i \text{ with } \bar{c}_j = \sum_{i=1}^{N} p_{ij} \mu_{k-1}^i \qquad \text{Eq. 28}$$

and $p_{ij}$ is the probability of switching to mode j given that the system is in mode i. It will be noted that the probabilities, $p_{ij}$, are what constitute the elements of the MSM, Π. The mixed covariance for $M_k^j$, $P_{k-1|k-1}^{0j}$ is computed as $$P_{k-1|k-1}^{0j} = \sum_{i=1}^{N} \mu_{k-1|k-1}^{i|j} [P_{k-1|k-1}^{i} + (X_{k-1|k-1}^{i} - X_{k-1|k-1}^{0j})(X_{k-1|k-1}^{i} - X_{k-1|k-1}^{0j})^T]. \quad \text{Eq. 29}$$

Then, during step S2, model-conditioned updates are generated. It will be noted that since the conventional Kalman filter equations provide the model-conditioned updates, additional discussion of this step can be omitted in the interest of brevity.

During step S3, model likelihood calculations are performed. More specifically, the likelihood function for model $M_k^j$, $\Lambda_k^j$ is computed with $\tilde{Z}_k^j$, $S_k^j$, and the assumption of Gaussian statistics. It is given by $$\Lambda_k^j = \frac{1}{\sqrt{|2\pi S_k^j|}} \exp\left[-0.5(\tilde{Z}_k^j)^T (S_k^j)^{-1} \tilde{Z}_k^j\right] \quad \text{Eq. 30}$$

It should be mentioned at this point that a positive lower bound of $10^{-6}$ is imposed on $\Lambda_k^j$ to provide numerical stability in the computer program.

Next, at step S4, the model probabilities are updated. It will be appreciated that the model probabilities, $\mu_k^j$, are updated as $$\mu_k^j = \frac{1}{c} \Lambda_k^j \text{ with } c = \sum_{i=1}^{N} \Lambda_k^i \bar{c}_i. \quad \text{Eq. 31}$$

Finally, during step S5, the state estimates are combined. The state estimate and error covariance for the IMM algorithm output, $X_{k|k}$ and $P_{k|k}$, respectively, are obtained from a probabilistic sum of the individual filter outputs and are given by $$X_{k|k} = \sum_{i=1}^{N} X_{k|k}^i \mu_k^i \quad \text{Eq. 32}$$

$$P_{k|k} = \sum_{i=1}^{N} \mu_k^i [P_{k|k}^i + (X_{k|k}^i - X_{k|k})(X_{k|k}^i - X_{k|k})^T]. \quad \text{Eq. 33A}$$

It should again be mentioned that due to the wide acceptance of the MM radar tracking filter structure within the academic community, momentum is gathering to introduce multiple-model filtering techniques into Navy tactical tracking systems. The IMM structure is the one that has been embraced with the most enthusiasm. If the IMM is to be used, what values should be selected for the Markov Switching Matrix? As has already been indicated, no optimal method exists for populating the MSM with the switching probabilities. The only constraints governing these probabilities are that the sum of the probabilities in each row must be unity and each element must have a value not less than zero and not greater than unity.

With the summary of the IMM algorithm now complete, including the role played by the MSM, it is now possible to consider one possible design of a MM switching logic that does not use any MSM. The exemplary embodiments of this design will be collectively referred to as the MM radar tracking filter employing (with) Alternative Switching Logic (ASL) to differentiate the exemplary embodiments according to the present invention from the IMM filter design discussed above.

It will be appreciated that non-MSM based Multiple Model switching logic designs and corresponding non-Markov Switching Matrix based switching methods advantageously would eliminate the need for ad hoc techniques of selecting matrix values. They would also eliminate the need to rely upon arbitrary assumptions. Also, non-Markov Switching Matrix based switching methods offer good filter response for all classes of target dynamic profiles. The discussion below explores several "mixing" methods by which the estimate for each filter model is re-initialized prior to executing the next cycle. Performance statistics of each method for sudden target maneuvers will also be examined for a wide class of target dynamic profiles using the Naval Surface Warfare Center Dahigren Division (NSWCDD) Benchmark series of target trajectories. In addition, the performance statistics will be compared to those of the traditional MSM within the IMM structure.

The equations governing ASL operation are derived as discussed below. Let a system occupy one of a set of possible states $\Omega = \{\xi_1, \xi_2, \ldots, \xi_N\}$. A Kalman filter is implemented for each possible state and the (conditional) output estimate vector from each state is computed. This state estimate is a conditional estimate as it is computed on the assumption that the target is always in that state. The probability that the target is in state i, $p_i$, is computed using the output from the $i^{th}$ Kalman filter. If $\hat{x}^i(k|k)$ is the output conditional estimate for the $i^{th}$ Kalman filter at time k, then the unconditional estimate $\hat{x}(k)$ is obtained using the rules of probability as follows:

$$\hat{x}(k) = \sum_{i=1}^{N} \hat{x}^i(k \mid k) p_i \quad \text{Eq. 33B}$$

where N is the number of states in the MM radar tracking filter.

Heretofore, the computation of these weights has involved an a priori Markov Switching Matrix whose entries were typically assigned values on an ad hoc basis. These values have a significant impact on the filter response time when the system switches between states in $\Omega$. The following derivation of state probabilities does not require a Markov Switching Matrix.

Define $$Pr\{\xi_i \mid Z(k)\} = Pr\{\xi_i \mid Z(k-1), z(k)\} = \frac{Pr\{\xi_i, Z(k-1), z(k)\}}{Pr\{Z(k-1), z(k)\}}$$

$$= \frac{Pr\{z(k) \mid \xi_i, Z(k-1)\}Pr\{\xi_i, Z(k-1)\}}{Pr\{Z(k-1), z(k)\}}$$

$$= \frac{Pr\{z(k) \mid \xi_i, Z(k-1)\}Pr\{\xi_i \mid Z(k-1)\}Pr\{Z(k-1)\}}{Pr\{z(k) \mid Z(k-1)\}Pr\{Z(k-1)\}}$$

$$= \frac{Pr\{z(k) \mid \xi_i, Z(k-1)\}}{Pr\{z(k) \mid Z(k-1)\}}Pr\{\xi_i \mid Z(k-1)\}.$$

Eq. 34

Now, $$Pr\{z(k) \mid Z(k-1)\} = \frac{Pr\{z(k), Z(k-1)\}}{Pr\{Z(k-1)\}}$$

$$= \frac{\sum_j Pr\{z(k), \xi_j, Z(k-1)\}}{Pr\{Z(k-1)\}}$$

$$= \frac{\sum_j Pr\{z(k) \mid \xi_j, Z(k-1)\}Pr\{\xi_j \mid Z(k-1)\}Pr\{Z(k-1)\}}{Pr\{Z(k-1)\}}$$

$$= \sum_j Pr\{z(k) \mid \xi_j, Z(k-1)\}Pr\{\xi_j \mid Z(k-1)\}.$$

Eq. 35

Substituting Eq. 35 into Eq. 34 produces $$Pr\{\xi_i \mid Z(k)\} = \frac{Pr\{z(k) \mid \xi_i, Z(k-1)\}}{\sum_j Pr\{z(k) \mid \xi_j, Z(k-1)\}Pr\{\xi_j \mid Z(k-1)\}} Pr\{\xi_i \mid Z(k-1)\}.$$

Eq. 36

Eq. 36 is the desired recursive expression for the model probabilities $Pr\{\xi_i \mid Z(k)\}$. It will be noted that $$Pr\{z(k) \mid \xi_i, Z(k-1)\} \Rightarrow N[H(k)\hat{X}_i(k \mid k-1), S_i]$$

Eq. 37 where $$S_i = H(k)P_i(k \mid k-1)H(k)^T + R(k).$$

Eq. 38

Eq. 37 and Eq. 38 are provided by the $i^{th}$ Kalman filter in the MM filter bank. Note the absence of any MSM in Eq. 36.

It should be mentioned at this point that the derivation given immediately above is not original. Eqs. 34–38 advantageously can be found in several publications including the book by Y. Bar-Shalom and Xiao-Rong Li, entitled "Estimation and Tracking Principles, Techniques, and Software" (Artech House, (1993)). However, while these equations are known, there has been no effort to implement the methodology expressed in these equations into a practical MM radar system filter. In contrast, the first through fourth preferred embodiments according to the present invention, which are discussed immediately below, provide several alternative architectures for the inventive MM radar tracking filter structure.

The MM radar tracking filter structure 1 previously illustrated in FIG. 3 will, in all likelihood, perform poorly in a typical tracking environment involving a maneuvering target. To illustrate the point, assume that a stream of CV trajectory data has been input to the MM radar tracking filter structure. In that case, the CV motion model filter 12 will be producing high quality estimates and $p_1$ will be close to unity. The estimates from the CA motion model filter 14, on the other hand, will contain large errors, since the CA filter 14 is designed around a motion model which is mismatched to the actual dynamic profile of the target of interest. If the target executes a sudden maneuver, initially the CV filter 12 will continue to be weighted near unity because of the high value of $p_1$. The situation is exacerbated by the divergent condition of the CA filter 14. Although the CA filter is now matched to the current target dynamic configuration, the large errors in its initial estimates render it difficult to obtain good immediate track on the target of interest. With the estimates from both filters now having significant errors, the values computed by the weighting logic will not be "optimal" and, thus, poor MM filter performance follows.

In order to overcome this problem, there must be some built-in feedback from the MM output to the inputs of the individual filters. The exemplary embodiments according to the present invention represent several possible architectures for this feedback. Some embodiments involve feedback of the output estimates while other embodiments involve feedback of both the output estimates and output covariance matrices. The performance of each is compared to the all others of the others below.

The structure outlined in FIG. 5 is the simplest multiple model design. Stated another way, FIG. 5 is a high level functional block diagram of a first preferred embodiment of a MM radar tracking filter 100 employing ASL according to the present invention. From inspection of FIG. 5, it will be observed that there is no feedback from the filter output to the filter input. Each filter iterates on its own previous estimate without the benefit of any information being fed back from the weighted output to each filter input.

More specifically, the MM radar tracking filter 100, which advantageously employs ASL, includes a splitter function 110 providing signals to both a CV filter function 112 and a CA filter function 114, the outputs of which are provided to first and second mixer functions 116 and 118, respectively. The output signals generated by the first and second mixer functions 116 and 118 are applied to a summer (adder) function 120, which provides the output of the MM radar tracking filter 100. It will be noted that the output signals generated by the CV and CA filter functions 112, 114 are also provided to an ASL function 122, which responds to the input signals by generating probability signals (values) $p_1$, $p_2$ applied to the first and second mixer functions 116, 118, respectively.

FIG. 6 is a high level block diagram of a second preferred embodiment of the MM radar tracking filter 200 employing ASL according to the present invention, which includes a splitter function 210 providing signals to both a CV filter function 212 and a CA filter function 214, the outputs of which are provided to first and second mixer functions 216 and 218, respectively. The output signals generated by the first and second mixer functions 216 and 218 are applied to a summer (adder) function 220, which provides the output of the MM radar tracking filter 200. It will be noted that the output of the summer function 220 advantageously is fed back to the inputs of the CV and CA filter functions 212, 214. It will also be noted that the output signals generated by the CV and CA filter functions 212, 214 are also provided to an ASL function 222, which responds to these input signals by generating probability signals (values) $p_1$, $p_2$ applied to the first and second mixer functions 216, 218, respectively.

In FIG. 6, the weighted estimate at the output of the filter is fed back to each filter input. For the next cycle, both filters use the same weighted estimate from the previous cycle as their initial estimate for computing the predicted estimate prior to making the next measurement.

Figure 7:
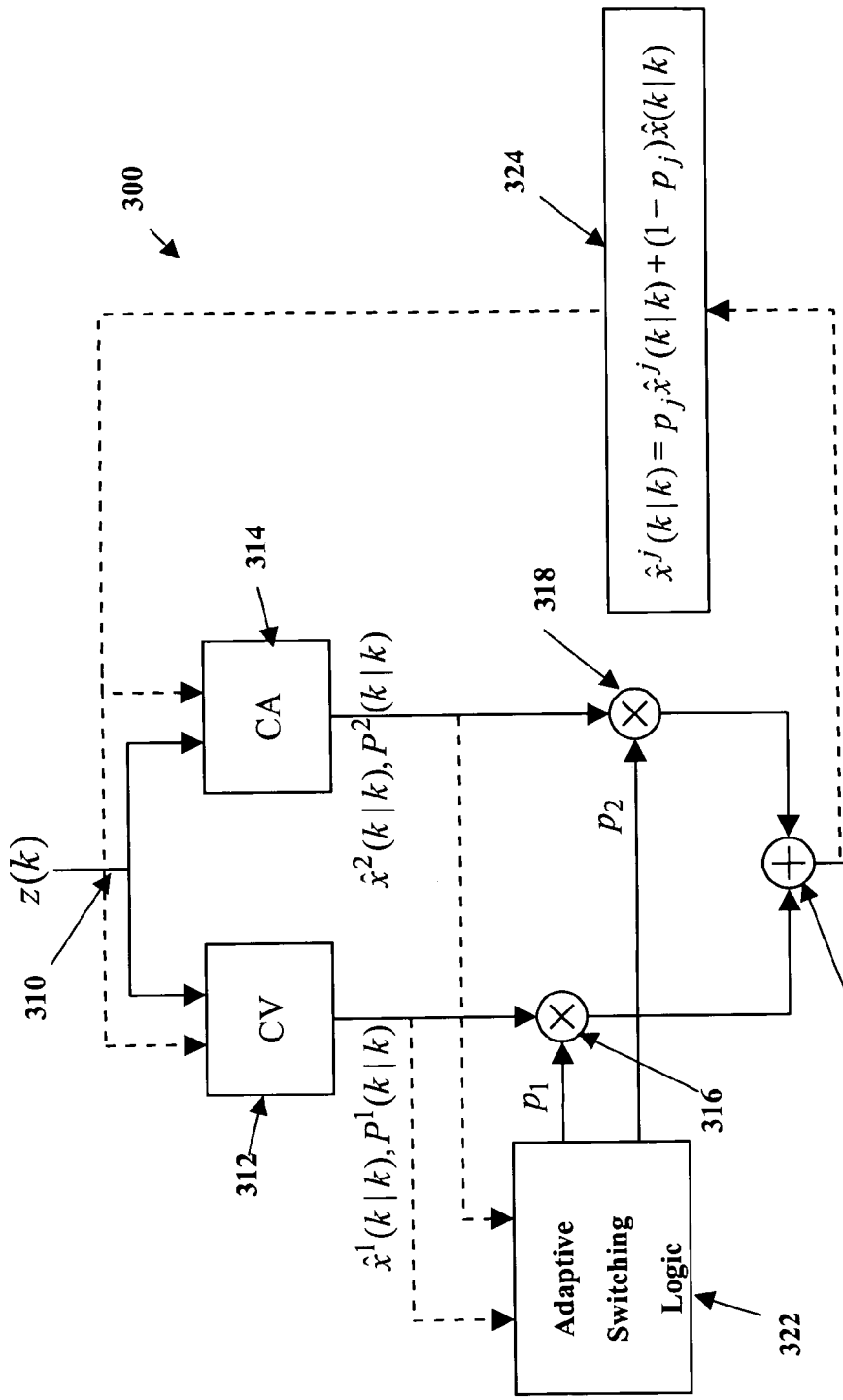
FIG. 7 is a high level block diagram of a third preferred embodiment of the MM radar tracking filter according to the present invention.

FIG. 7 is a high level block diagram of a third preferred embodiment of the MM radar tracking filter 300 employing ASL according to the present invention, which includes a splitter function 310 providing signals to both a CV filter function 312 and a CA filter function 314, the outputs of which are provided to first and second mixer functions 316 and 318, respectively. The output signals generated by the first and second mixer functions 316 and 318 are applied to a summer (adder) function 320, which provides the output of the MM radar tracking filter 300. It will be noted that the output of the summer function 320 advantageously is fed back to the inputs of the CV and CA filter functions 312, 314 via a convex sum and weight estimator function 324. It will also be noted that the output signals generated by the CV and CA filter functions 312, 314 are also provided to an ASL function 322, which responds to these input signals by generating probability signals (values) $p_1$, $p_2$ applied to the first and second mixer functions 316, 318, respectively.

As shown in FIG. 7, at the end of each cycle, each filter's estimate is updated with the convex sum of its current estimate and the weighted output estimate from the filter bank. Using this method, each filter is updated with either its current estimate or the weighted estimate, whichever is the closest to the target configuration as determined by the mathematics of the convex sum.

Figure 8:
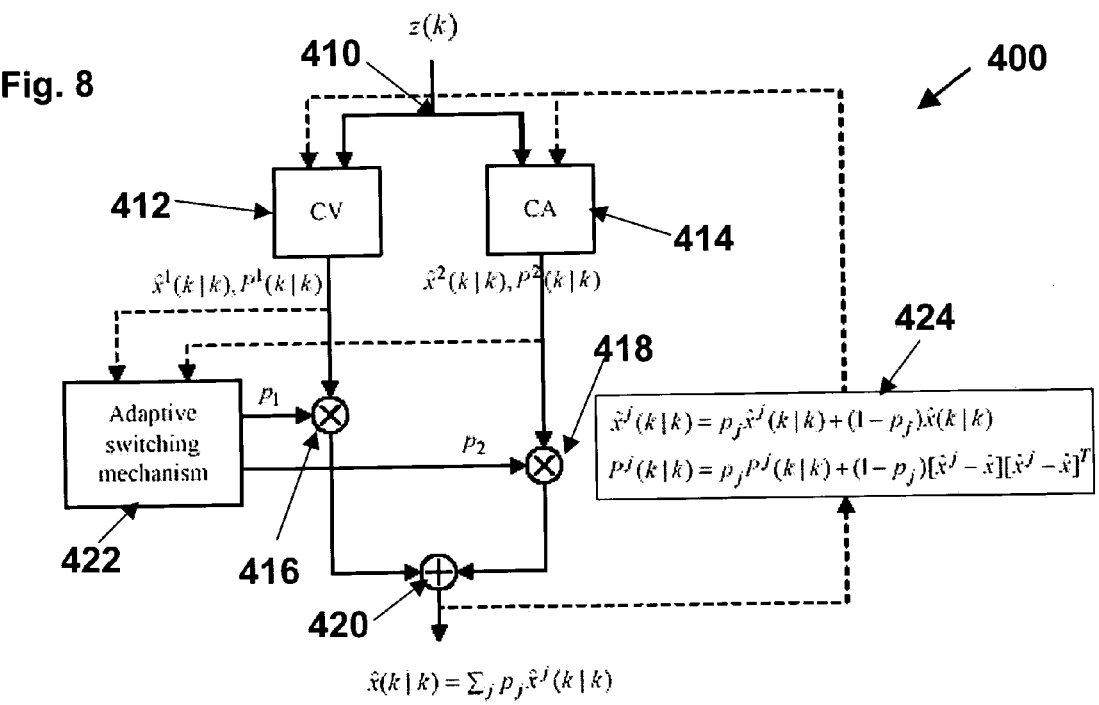
FIG. 8 is a high level block diagram of a fourth preferred embodiment of the MM radar tracking filter according to the present invention.

FIG. 8 is a high level block diagram of a fourth preferred embodiment of the MM radar tracking filter 400 employing ASL according to the present invention, which includes a splitter function 410 providing signals to both a CV filter function 412 and a CA filter function 414, the outputs of which are provided to first and second mixer functions 416 and 418, respectively. The output signals generated by the first and second mixer functions 416 and 418 are applied to a summer (adder) function 420, which provides the output of the MM radar tracking filter 400. It will be noted that the output of the summer function 420 advantageously is fed back to the inputs of the CV and CA filter functions 412, 414 via a complex calculation function 424, which determines the convex sum, the weighted estimate, and the weighted covariance, as discussed below. It will also be noted that the output signals generated by the CV and CA filter functions 412, 414 are also provided to an ASL function 422, which responds to these input signals by generating probability signals (values) $p_1$, $p_2$ applied to the first and second mixer functions 416, 418, respectively.

In FIG. 8, at the end of each cycle, each filter's estimate is updated with the convex sum of its current estimate and the weighted output estimate from the filter bank. Similarly, the covariance matrix for each filter is updated with the convex sum of its current covariance matrix and the difference between its conditional estimate and the output weighted estimate, as shown in FIG. 8. This advantageously produces an updated error covariance matrix for each filter function that closely represents the actual difference statistics between its conditional estimate and the true target state vector in so far as the weighted estimate vector closely estimates the true target configuration.

Figure 9C:
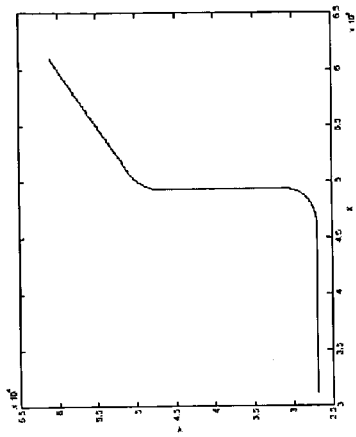
FIGS. 9A, 9B, 9C, 9D, 9E, and 9F illustrate various target trajectories that were employed in evaluating the performance of the first through fourth preferred embodiments illustrated in FIGS. 5–8, respectively, and in comparing the performance of the preferred embodiments to the IMM filter employing the MSM Π illustrated in FIG. 4A.
Figure 9F:
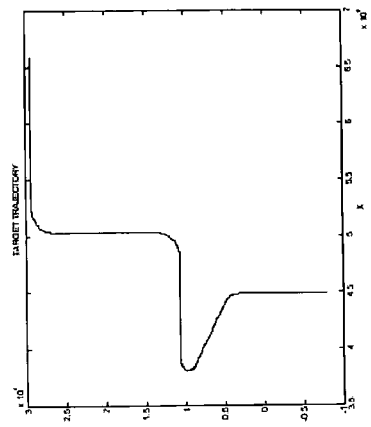
Figure 9B:
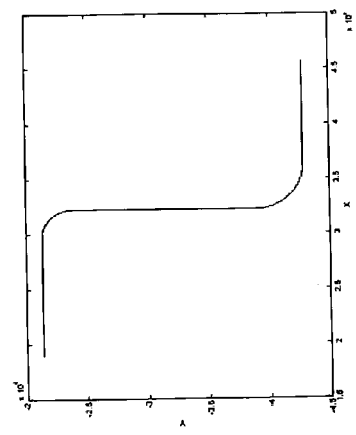
Figure 9E:
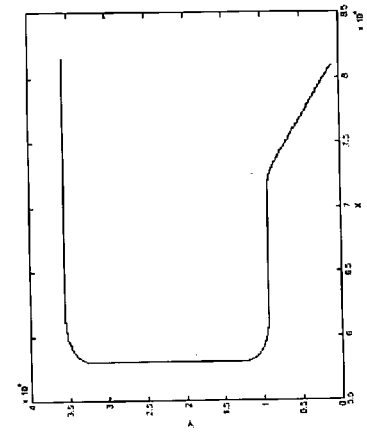
Figure 9A:
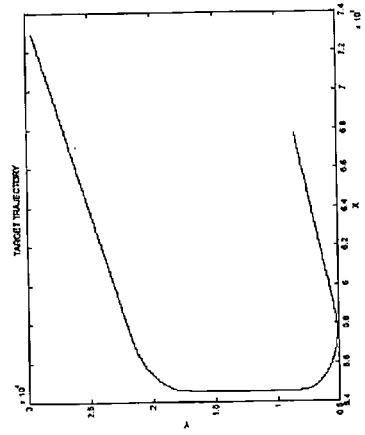

Having presented four preferred embodiments of the MM radar tracking filter employing ASL according to the present invention, it would be beneficial to examine the performance of each of these preferred embodiments of the present invention with respect to a set of six Benchmark trajectories (targets) routinely employed by the Naval Surface Warfare Center Dahlgren Division (NSWCDD). The targets, whose tracks are illustrated in FIGS. 9A–9F, perform as much as a 7-g lateral acceleration and a 2-g longitudinal acceleration. It will be appreciated that the range of the target can vary from 2 to 100 km. Target trajectory 1, which is illustrated in FIG. 9A, is representative of a low-maneuvering target while target trajectory 6, which is depicted in FIG. 9F, is representative of a high-maneuvering target.

Referring now to FIGS. 9A–9F, each of the target trajectories will be described in detail. For example, in trajectory 1, which is shown in FIG. 9A, the target flies from an initial range of 80 km on a constant course with a speed of 290 m/s at an altitude of 1.26 km for the first minute. The aircraft then performs a mild, 2-g turn and continues on a new course for a period of 30 s, when a 3-g turn is performed to establish a new heading. The aircraft then flies away from the radar to a final range of 70 km.

In contrast, in trajectory 6, which is shown in FIG. 9F, the target flies at an initial range of 65 km, speed of 426 m/s and an altitude of 1.55 km. Constant speed and course are maintained for a period of 30 s upon which a 7-g turn is performed. The new course is maintained for another 30 s. A 6-g turn is then performed while the throttle is reduced and the aircraft is nosed over in order to decrease altitude. A final altitude of 0.79 km is obtained, and after a time span of 30 s, another 6-g turn and full throttle are commanded. After 30 s, a 7-g turn is performed. Upon completion of the turn, straight and level; non-accelerating flight is maintained for the completion of the trajectory.

The other target trajectories fall between these two extremes. For example, in trajectory 2, which is depicted in FIG. 9B, the target flies at an initial range of 45 km, speed of 305 m/s, and altitude of 4.57 km. The target performs a 2.5 g-turn through 90 of course change. After the turn is completed, the target descends gradually to an altitude of 3.1 km. A 4-g turn rolling out to straight and level flight is then performed at a constant speed of 305 m/s. The trajectory profile ends near a range of 20 km. In contrast, in trajectory 3, which is illustrated in FIG. 9C, the target flies at an initial range of 63 km, speed of 457 m/s and altitude of 3.0 km. The aircraft flies straight and level for the first 30 s. A 4-g turn is then performed through a 45 course change. Straight and level, non-accelerating flight is continued for the next 30 s. A second 4-g turn through a 90 course change is performed while the aircraft decelerates to a speed of 274 m/s. Straight and level flight is maintained for the remainder of the flight after the course change is completed.

Figure 9D:
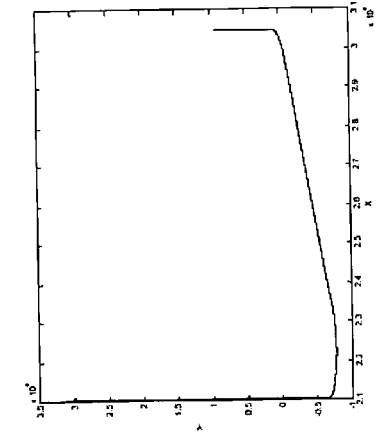

A still more difficult to solve target trajectory 4 is shown in FIG. 9D. In trajectory 4, the target flies at an initial range of 30 km and maintains a speed of 251 m/s and altitude of 2.29 km for the first 30 s. A 4-g turn is performed through a course change of 45. After another 30 s, a 6-g turn is performed as the throttle is increased to full afterburner. The aircraft then pitches up and climbs to an altitude of 4.57 km. Following the climb, straight and level, non-accelerating flight is maintained for the completion of the trajectory. Finally, with respect to target trajectory 5, which is illustrated in FIG. 9E, the target is initialized in a thrusting acceleration at a range of 81 km with a speed of 274 m/s and altitude of 1.5 km. After a period of 30 s, a 5-g turn is performed while maintaining full throttle. This turn is followed 20 s later by a 7-g turn. After the second turn is completed, straight and level, non-accelerating flight is performed for 30 s, upon which a 6-g turn is performed concurrently with a pitch up and a climb. After an altitude of 4.45 km is achieved, straight and level, non-accelerating flight is flown for the completion of the trajectory.

It should be noted that in comparing the performance of the MM radar tracking filters employing ASL with that offered by the IMM architecture, the only difference between the two approaches lies in the switching logic. In other words, the Process Noise covariance matrix is the same for corresponding motion models in both the ASL and IMM designs. The time varying measurement error covariance matrix has the same mathematical structure in both approaches. The MSM used in the IMM filter employs the following values:

$$\Pi = \begin{bmatrix} .95 & .05 \\ .05 & .95 \end{bmatrix} \qquad \text{Eq. 39}$$

The performance of the various preferred embodiments of a MM radar tracking filter employing ASL according to the present invention will now be presented with respect to the IMM filter depicted in FIG. 4A. More specifically, the performance of the first through fourth preferred embodiments of the present invention will be compared and contrasted with a conventional IMM filter while referring to FIGS. 9A through 21D, inclusive. It will be noted that, for completeness, the performance of the first through fourth preferred embodiments according to the present invention will be examined for both target trajectory 1 and target trajectory 6. See FIGS. 10A–17D. Thereafter, only the fourth preferred embodiment of the MM radar tracking filter of the present invention will be evaluated with respect to target trajectories 2–5. See FIGS. 18A–21D.

It should be noted that all of the comparisons presented below are made based on the Root Square Error (RSE) values using both the ASL and IMM architectures. Thus, in the following analysis of the results, position RSE represents the square root of the sum of the squares of the errors in the target's estimated position in three dimensions at each measurement time, averaged over all the Monte Carlo runs. A corresponding definition applies to the RSE errors in velocity and acceleration. In addition, the evaluation of the performance of the first through fourth preferred embodiments of the present invention is made based on the number of times that ASL RSE is less than IMM RSE.

Figure 10A:
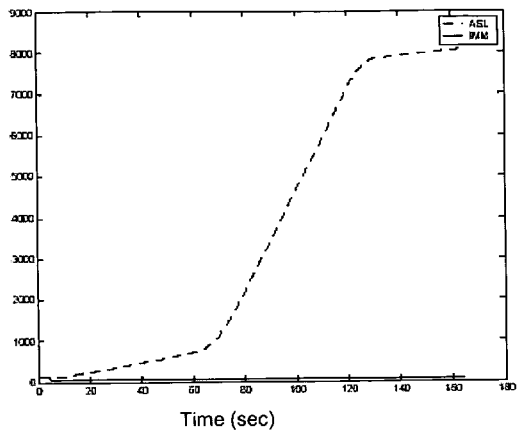
FIGS. 10A, 10B, 10C, and 10D collectively compare and contrast the performance of the radar filter systems depicted in FIGS. 4A and 5 for target 1, where
Figure 10B:
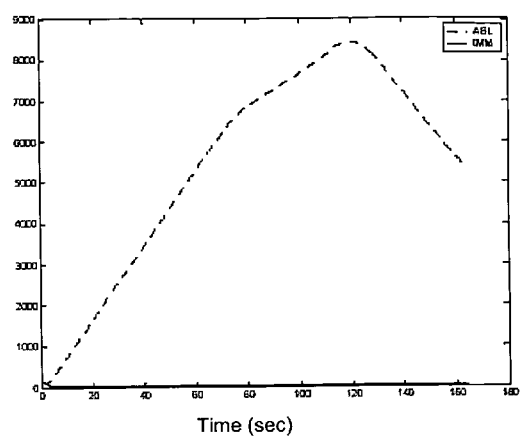
Figure 10C:
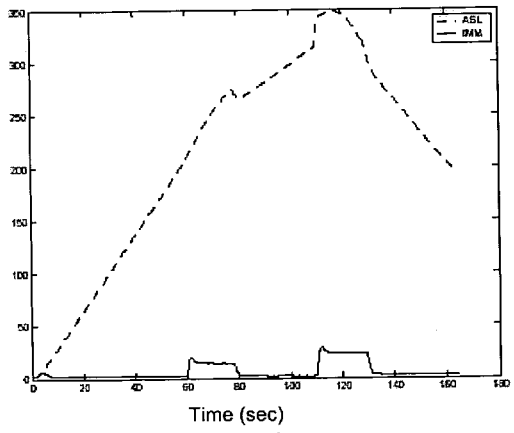
Figure 10D:
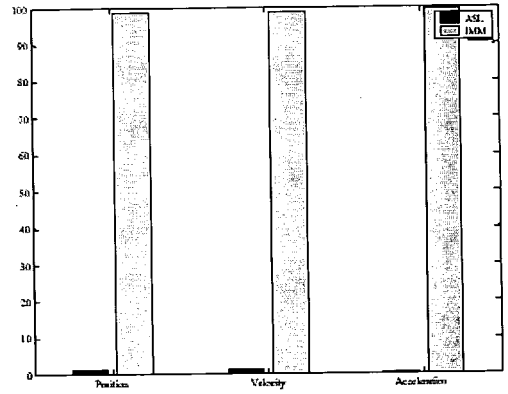

FIGS. 10A, 10B, 10C, and 10D collectively compare and contrast the performance of the radar filter systems depicted in FIGS. 4A and 5 for target 1, where FIG. 10A illustrates the root square error (RSE) for position, FIG. 10B illustrates the RSE for velocity, FIG. 10C illustrates the RSE for acceleration, and FIG. 10D depicts the number of times that the RSE for the first preferred embodiment according to the present invention depicted in FIG. 5 is less that the RSE for the IMM radar filter system shown in FIG. 4A. It will be appreciated that the MM radar tracking filter illustrated in FIG. 5 employs ASL methodology but does so without feedback. FIGS. 10A–10D show that the IMM performance is vastly superior to that of first preferred embodiment of the present invention. More specifically, in the MM radar tracking filter 100, i.e., the first preferred embodiment of the present invention, RSE errors in position, velocity and acceleration increase at an alarming rate compared to those of the IMM.

Figure 11A:
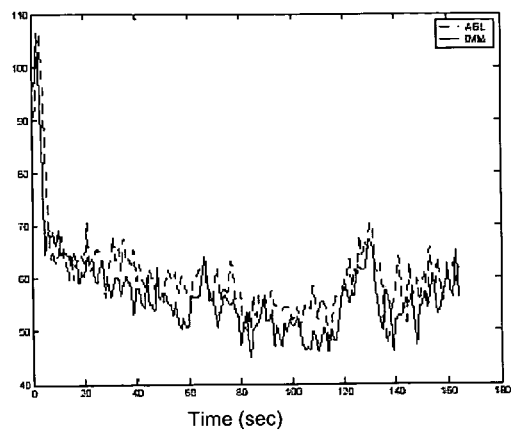
FIGS. 11A, 11B, 11C, and 11D collectively compare and contrast the performance of the radar filter systems depicted in FIGS. 4A and 6 for target 1, where
Figure 11B:
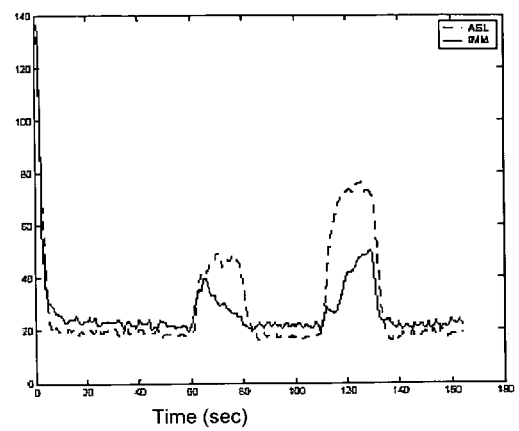
Figure 11C:
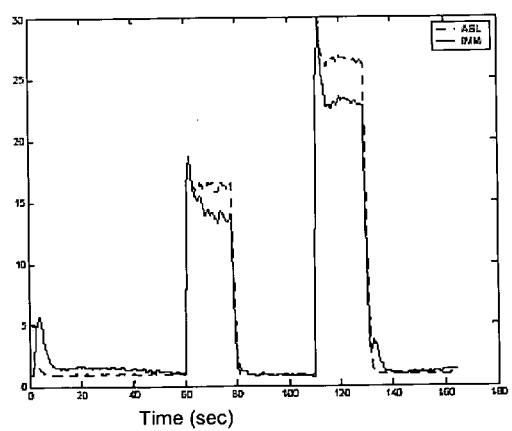
Figure 11D:
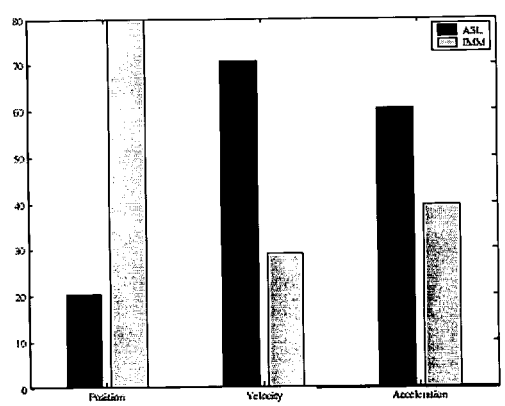

In contrast, FIGS. 11A, 11B, 11C, and 11D collectively compare and contrast the performance of the radar filters depicted in FIGS. 4A and 6 for target 1. More specifically, FIG. 11A illustrates the RSE for position, FIG. 11B illustrates the RSE for velocity, FIG. 11C illustrates the RSE for acceleration. FIG. 11D depicts the number of times that the RSE for the second preferred embodiment according to the present invention depicted in FIG. 6 is less that the RSE for the IMM radar filter system shown in FIG. 4A. It will be appreciated from FIGS. 11A–11D that the performance is somewhat improved where the feedback of the weighted estimate to each filter input has stabilized the operation of the MM radar tracking system 200. The improvement garnered from the simple expedient of feeding back the weighted output estimates can be seen by comparing FIGS. 10D and 11D. In the former, the number of times that the first preferred embodiment of the present invention RSE surpasses the IMM RSE is virtually zero, whereas in the latter figure depicting the second preferred embodiment of the present invention, system under test RSE surpasses the IMM performance 70% of the time for velocity and 60% of the time for acceleration.

Figure 12A:
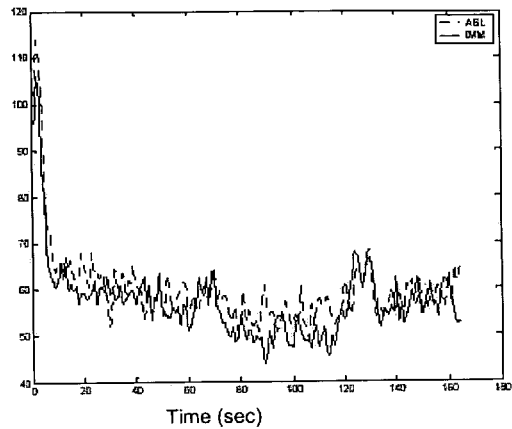
FIGS. 12A, 12B, 12C, and 12D collectively compare and contrast the performance of the radar filter systems depicted in FIGS. 4A and 7 for target 1, where
Figure 12B:
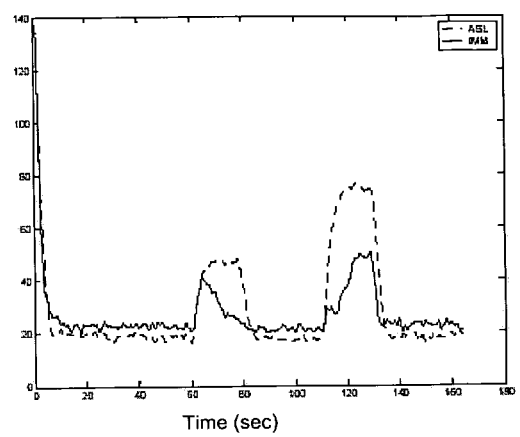
Figure 12C:
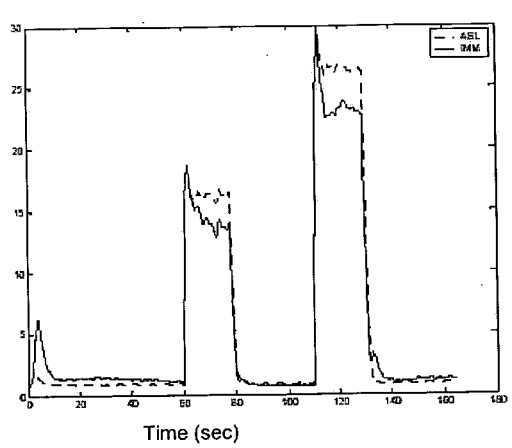
Figure 12D:
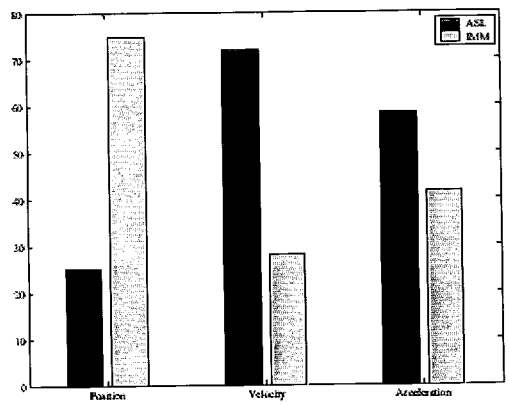

Moreover, FIGS. 12A, 12B, 12C, and 12D collectively compare and contrast the performance of the radar filter systems depicted in FIGS. 4A and 7 for target 1. Here, FIG. 12A illustrates the RSE for position, FIG. 12B illustrates the RSE for velocity, and FIG. 12C illustrates the RSE for acceleration. FIG. 12D depicts the number of times that the RSE for the third preferred embodiment according to the present invention depicted in FIG. 7 is less that the RSE for the IMM radar filter system shown in FIG. 4A. It will be appreciated that the MM radar tracking filter 300 depicted in FIG. 7 employs ASL based on feedback of convex sum of the weighted estimate. It will be noted that the performance arising from feedback of the convex sum in FIGS. 12A–12D is very close to that obtained with feedback of the weighted estimate alone. In short, the statistics on relative performance in FIG. 12D remain largely unchanged from those found in FIG. 11D.

Figure 13A:
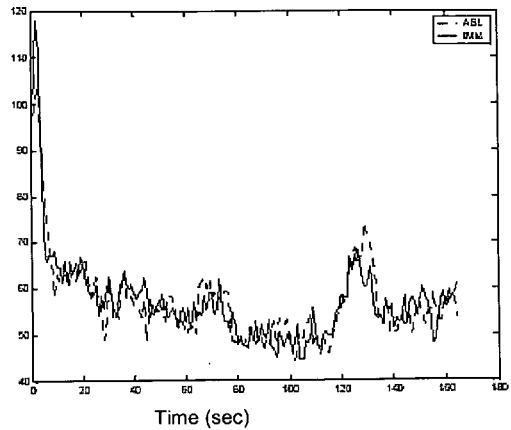
FIGS. 13A, 13B, 13C, and 13D collectively compare and contrast the performance of the radar filter systems depicted in FIGS. 4A and 8 for target 1, where
Figure 13B:
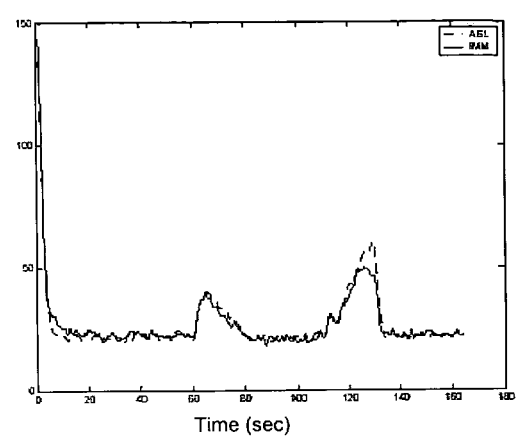
Figure 13C:
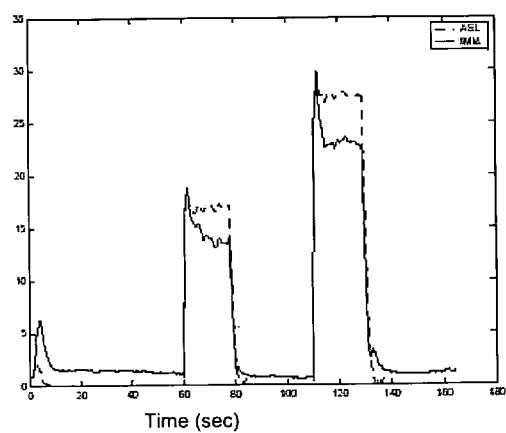
Figure 13D:
Figure 14A:
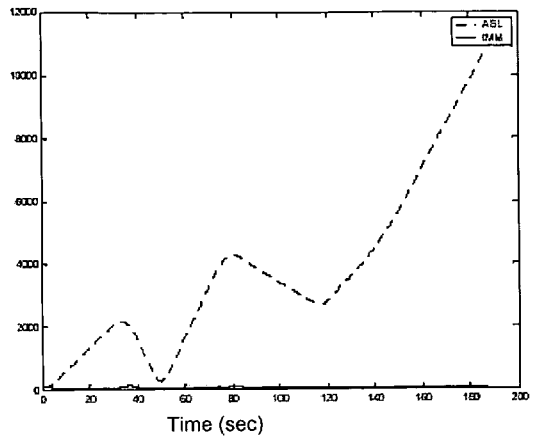
FIGS. 14A, 14B, 14C, and 14D collectively compare and contrast the performance of the radar filter systems depicted in FIGS. 4A and 5 for target 6, where
Figure 14B:
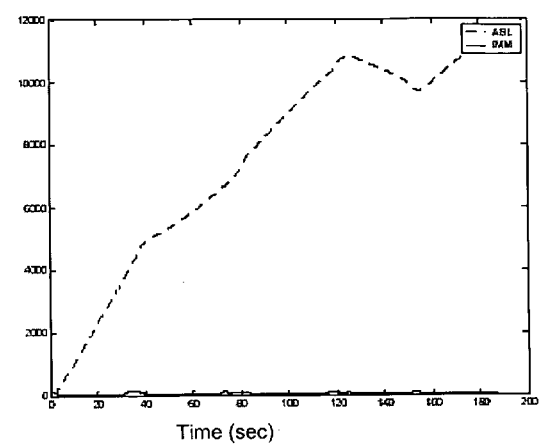
Figure 14C:
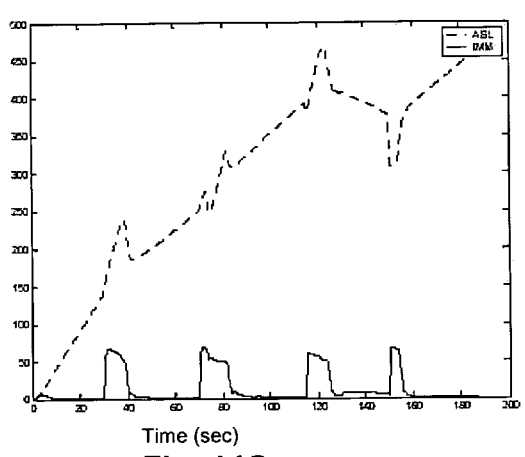
Figure 14D:
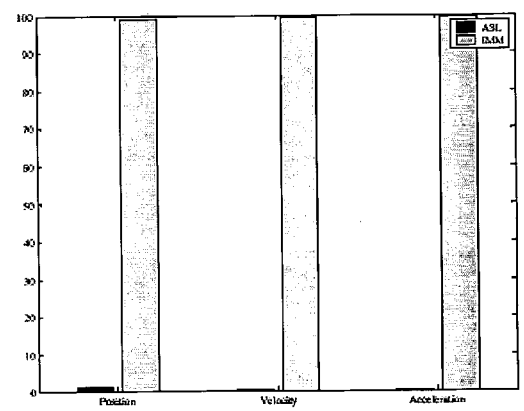
Figure 15A:
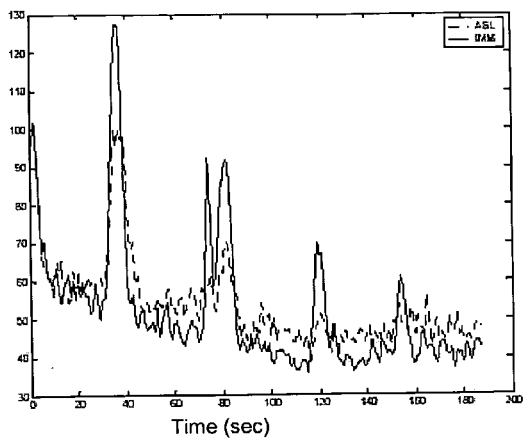
FIGS. 15A, 15B, 15C, and 15D collectively compare and contrast the performance of the radar filter systems depicted in FIGS. 4A and 6 for target 6, where
Figure 15B:
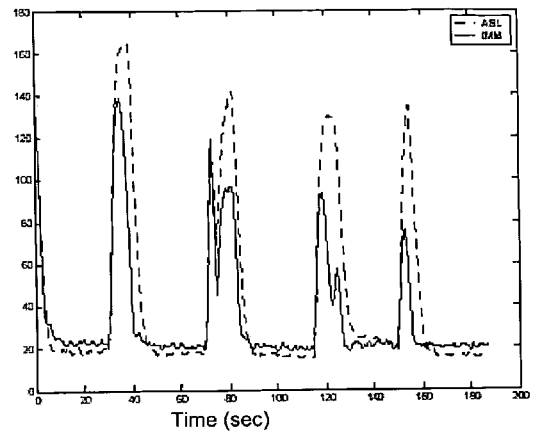
Figure 15C:
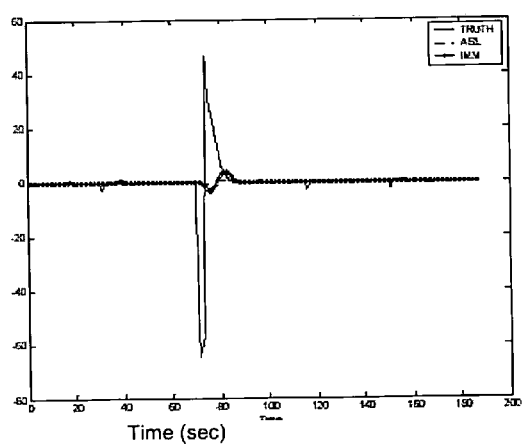
Figure 15D:
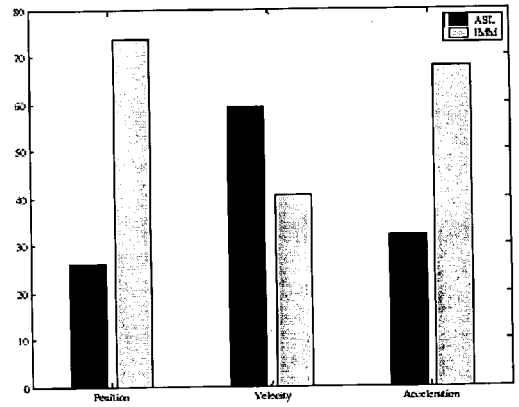
Figure 16A:
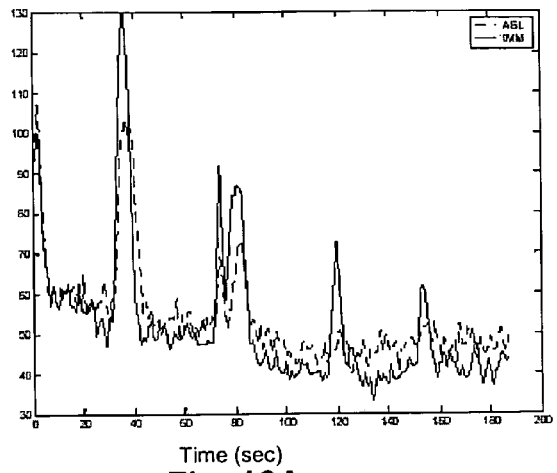
FIGS. 16A, 16B, 16C, and 16D collectively compare and contrast the performance of the radar filter systems depicted in FIGS. 4A and 7 for target 6, where
Figure 16B:
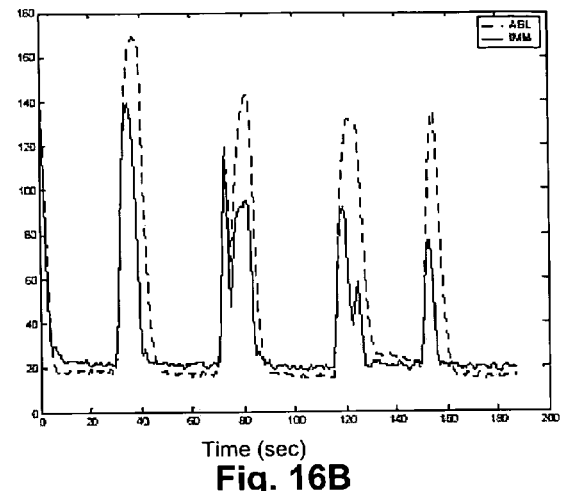
Figure 16C:
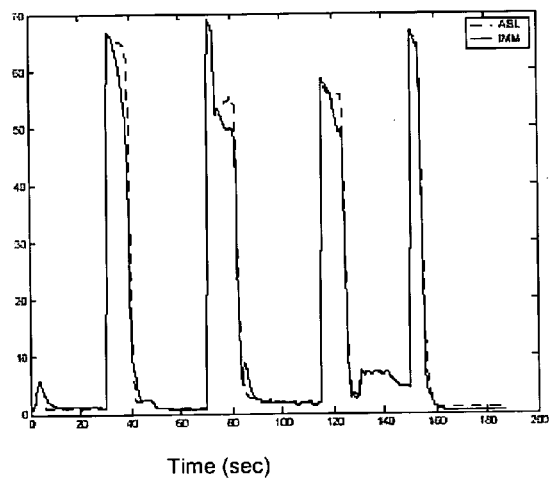
Figure 16D:
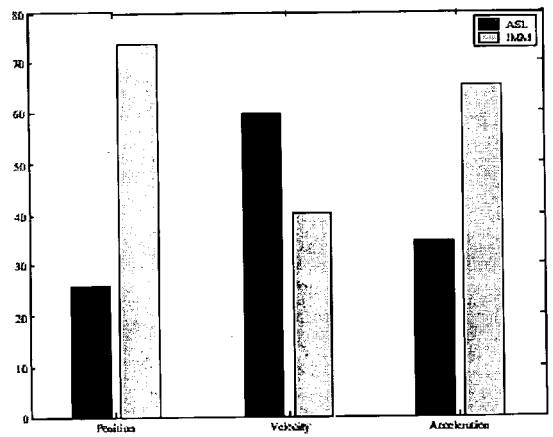
Figure 17A:
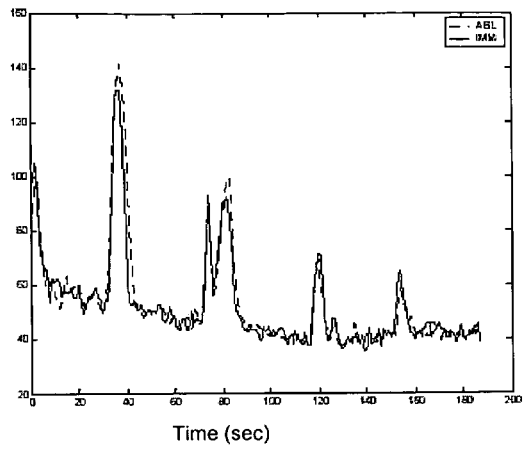
FIGS. 17A, 17B, 17C, and 17D collectively compare and contrast the performance of the radar filter systems depicted in FIGS. 4A and 8 for target 6, where
Figure 17B:
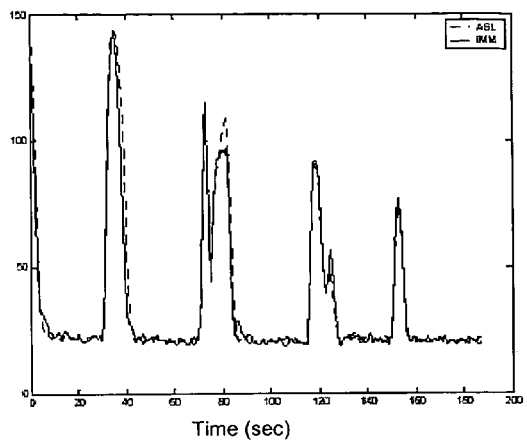
Figure 17C:
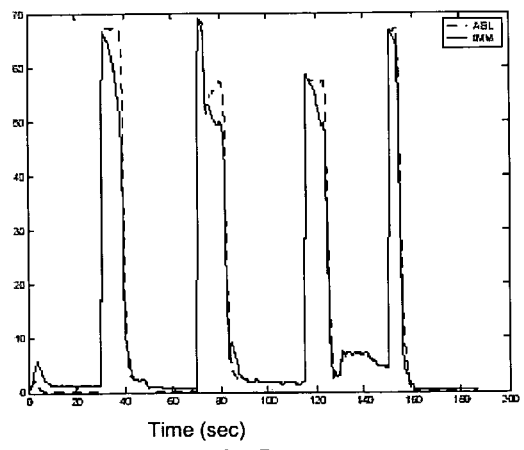
Figure 17D:
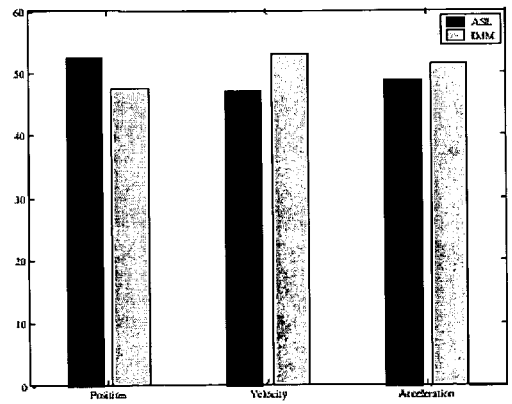
Figure 18A:
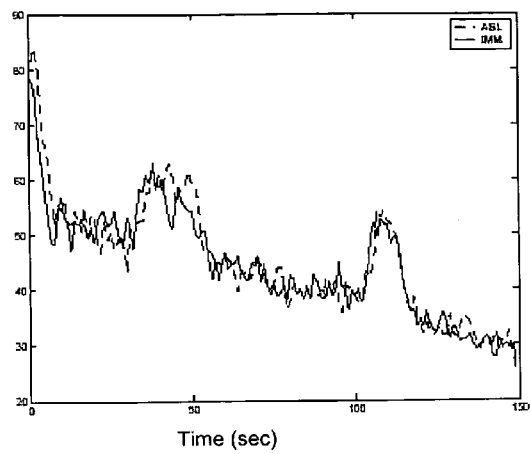
FIGS. 18A, 18B, 18C, and 18D collectively compare and contrast the performance of the radar filter systems depicted in FIGS. 4A and 8 for target 2, where
Figure 18B:
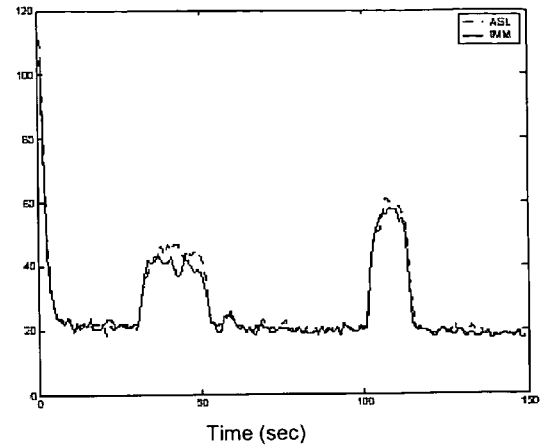
Figure 18C:
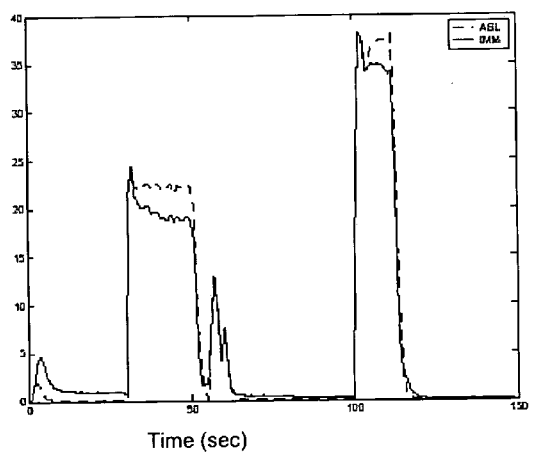
Figure 18D:
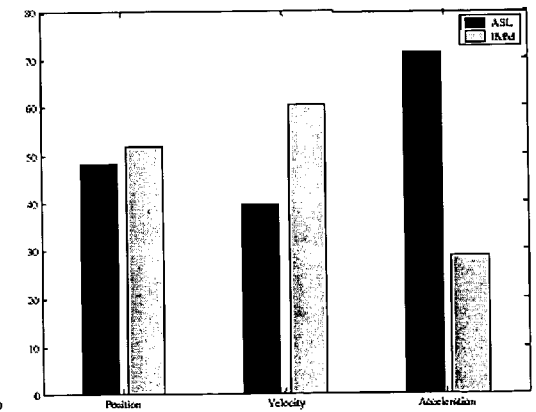
Figure 19A:
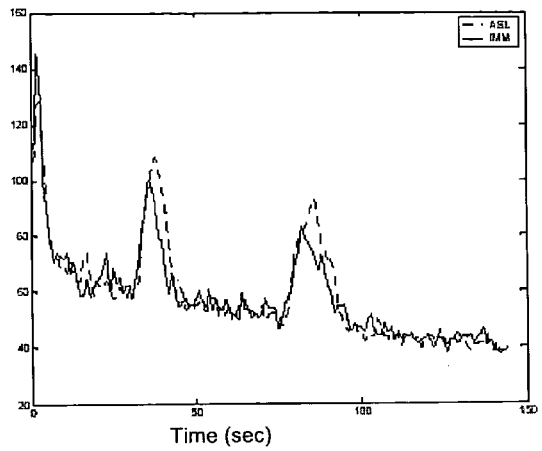
FIGS. 19A, 19B, 19C, and 19D collectively compare and contrast the performance of the radar filter systems depicted in FIGS. 4A and 8 for target 3, where
Figure 19B:
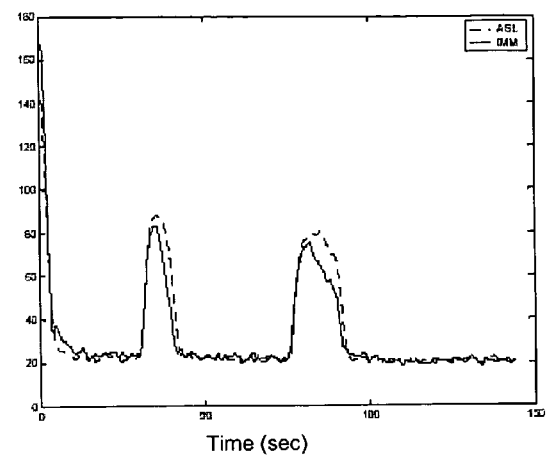
Figure 19C:
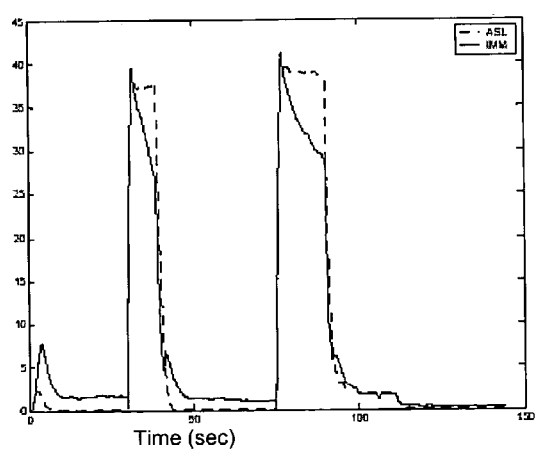
Figure 19D:
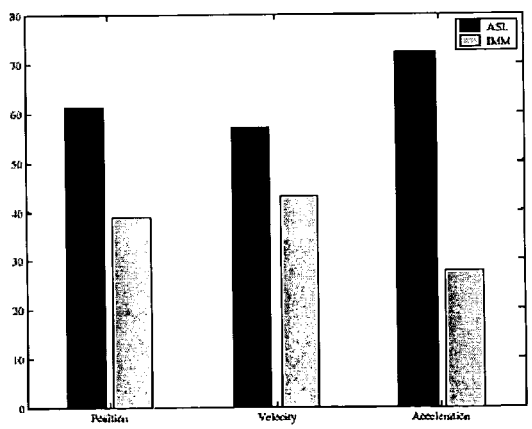
Figure 20A:
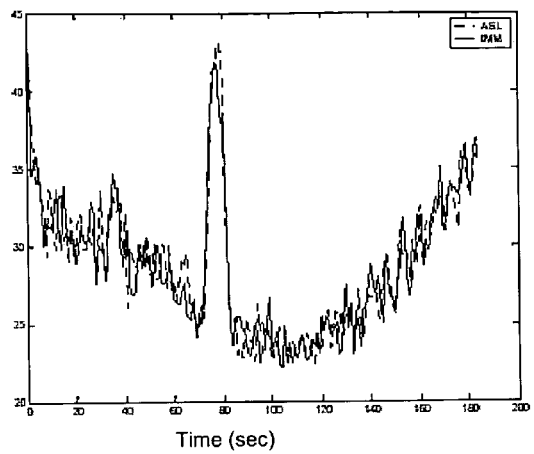
FIGS. 20A, 20B, 20C, and 20D collectively compare and contrast the performance of the radar filter systems depicted in FIGS. 4A and 8 for target 4, where
Figure 20B:
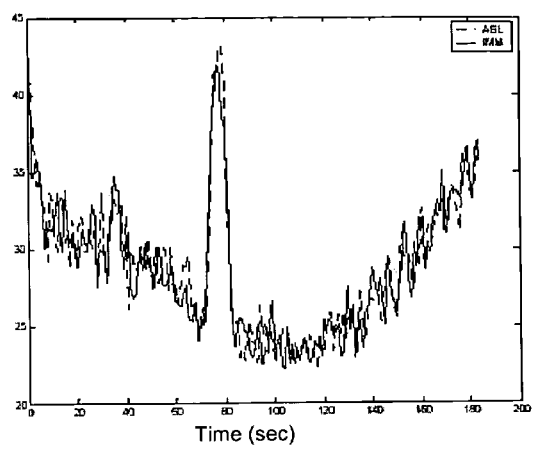
Figure 20C:
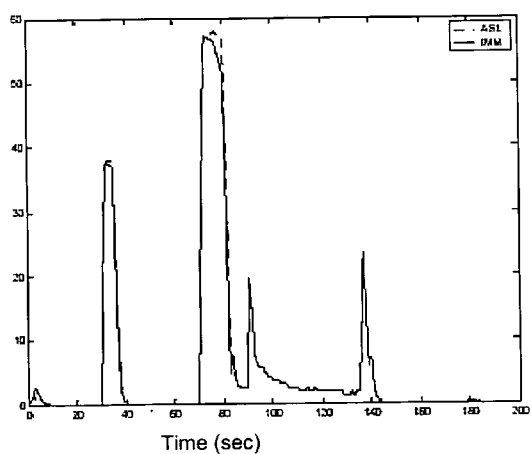
Figure 20D:
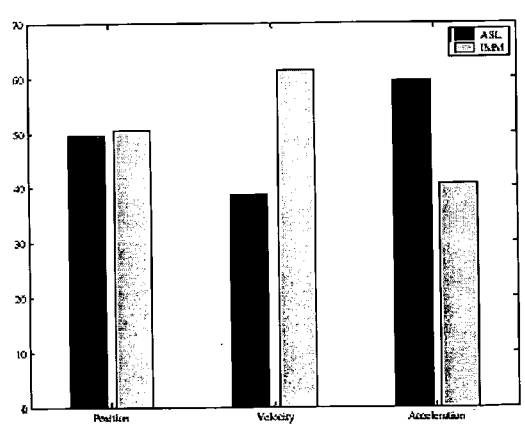
Figure 21A:
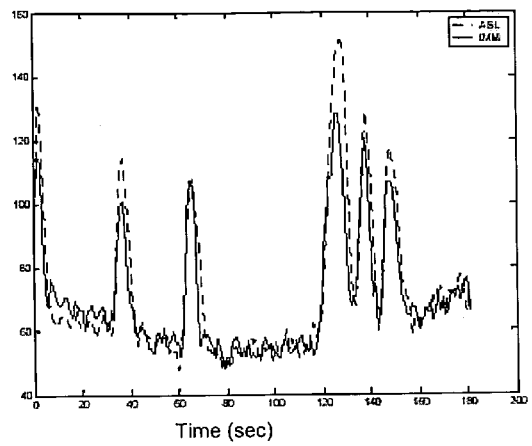
Figure 21B:
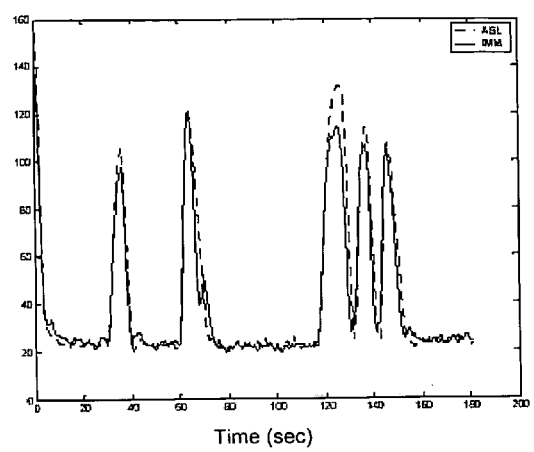
Figure 21C:
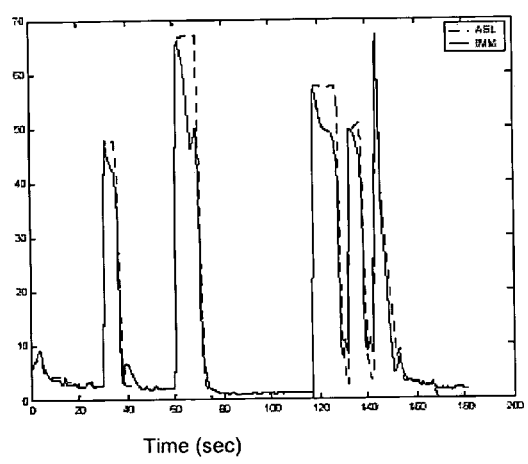
Figure 21D:
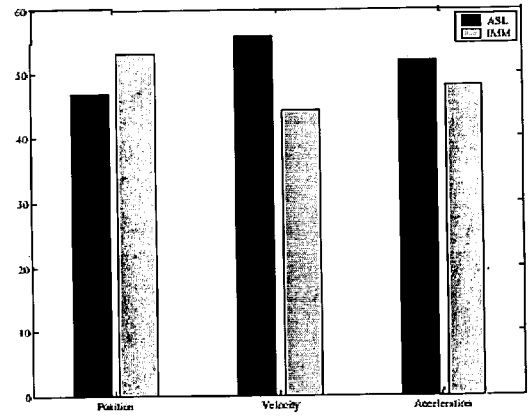
FIG. 21D depicts the number of times that the RSE for the fourth preferred embodiment according to the present invention depicted in FIG. 8 is less that the RSE for the IMM radar filter system shown in FIG. 4A.

Finally, FIGS. 13A, 13B, 13C, and 13D compare and contrast the performance of the radar filter systems depicted in FIGS. 4A and 8 for target 1, where FIG. 13A illustrates the RSE for position, FIG. 13B illustrates the RSE for velocity, and FIG. 13C illustrates the RSE for acceleration. Moreover, FIG. 13D depicts the number of times that the RSE for the fourth preferred embodiment according to the present invention depicted in FIG. 8 is less that the RSE for the IMM radar filter system shown in FIG. 4A. It should again be mentioned that the MM radar tracking filter 400 of the fourth preferred embodiment of the present invention employs ASL based on feedback of convex sum of the weighted estimate and weighted covariance. It will be appreciated that the performance of the architecture of the MM radar tracking filter employing ASL based on feedback of convex sum of weighted estimates and weighted covariance shows a significant improvement over the previously discussed MM radar tracking filters 100, 200, and 300. Comparing FIG. 13D with FIG. 12D, the position RSE statistics show significant improvement for the fourth preferred embodiment. The velocity RSE statistics are comparable to those of the IMM while the acceleration RSE statistics are superior to those of the IMM.

It will be appreciated that the preceding results applied only to target trajectory 1, which corresponds to a low-maneuvering target. The discussion which follows analyzes the relative performance of the architectures of MM radar tracking filters 100, 200, 300, and 400, all of which employ ASL, for the highly-maneuvering target trajectory 6.

From FIGS. 14A–14D, it will once again be observed that the MM radar tracking filter 100 of the present invention performs relatively poorly with respect to the conventional IMM filter illustrated in FIG. 4A. However, the performance of the MM radar tracking filter 200 with ASL according to the second preferred embodiment of the present invention shows a significant improvement in FIGS. 15A–15D. Moreover, the performance of the MM radar tracking filter 300 employing ASL according to the third preferred embodiment of the present invention is quite similar to that of the second preferred embodiment of the present invention. The position, velocity and acceleration RSE values for the MM radar tracking filter 400 employing ASL shown in FIGS. 17A–17C for the fourth preferred embodiment of the present invention are comparable to those of the IMM. From FIG. 17D, it will be appreciated that the position RSE values are superior to the IMM values for 52% of the trajectory whereas the IMM filter RSE is superior for velocity and acceleration.

Again, the fourth preferred embodiment of the present invention is clearly the best-performing and, in many cases, it exceeds the performance provided by the conventional IMM filter architecture. Consequently, the performance of the MM radar tracking filter 400 with ASL according to the fourth preferred embodiment of the present invention is analyzed for the remaining Benchmark trajectories 2–5. From inspection of FIGS. 18A–21D, it will be appreciated that the MM radar tracking filter 400 with ASL performs as well as or better that the conventional IMM filter 50.

Figure 22:
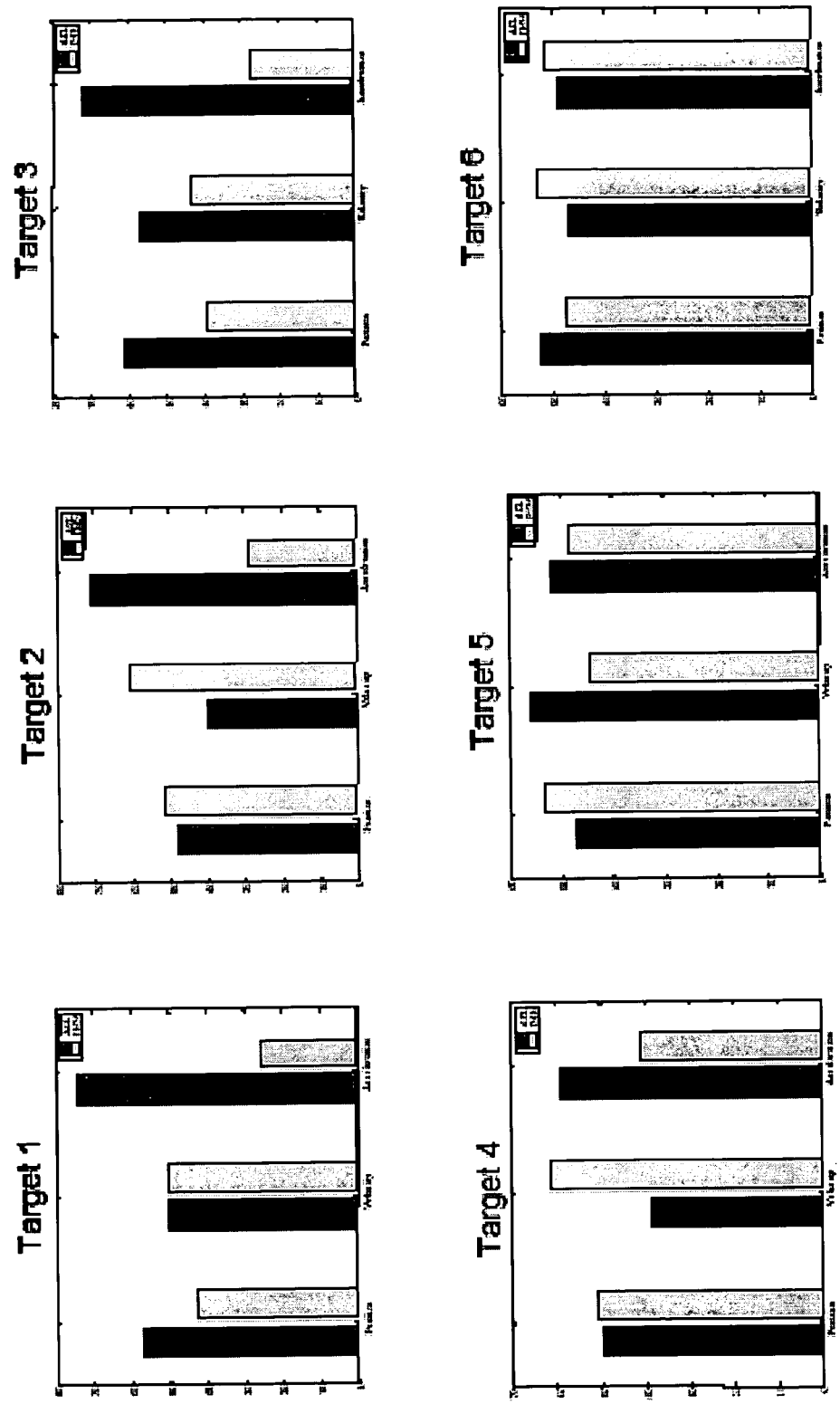
FIG. 22 is a compilation of FIGS. 13D, 17D, 18D, 19D, 20D, and 21D.
Figure 23:
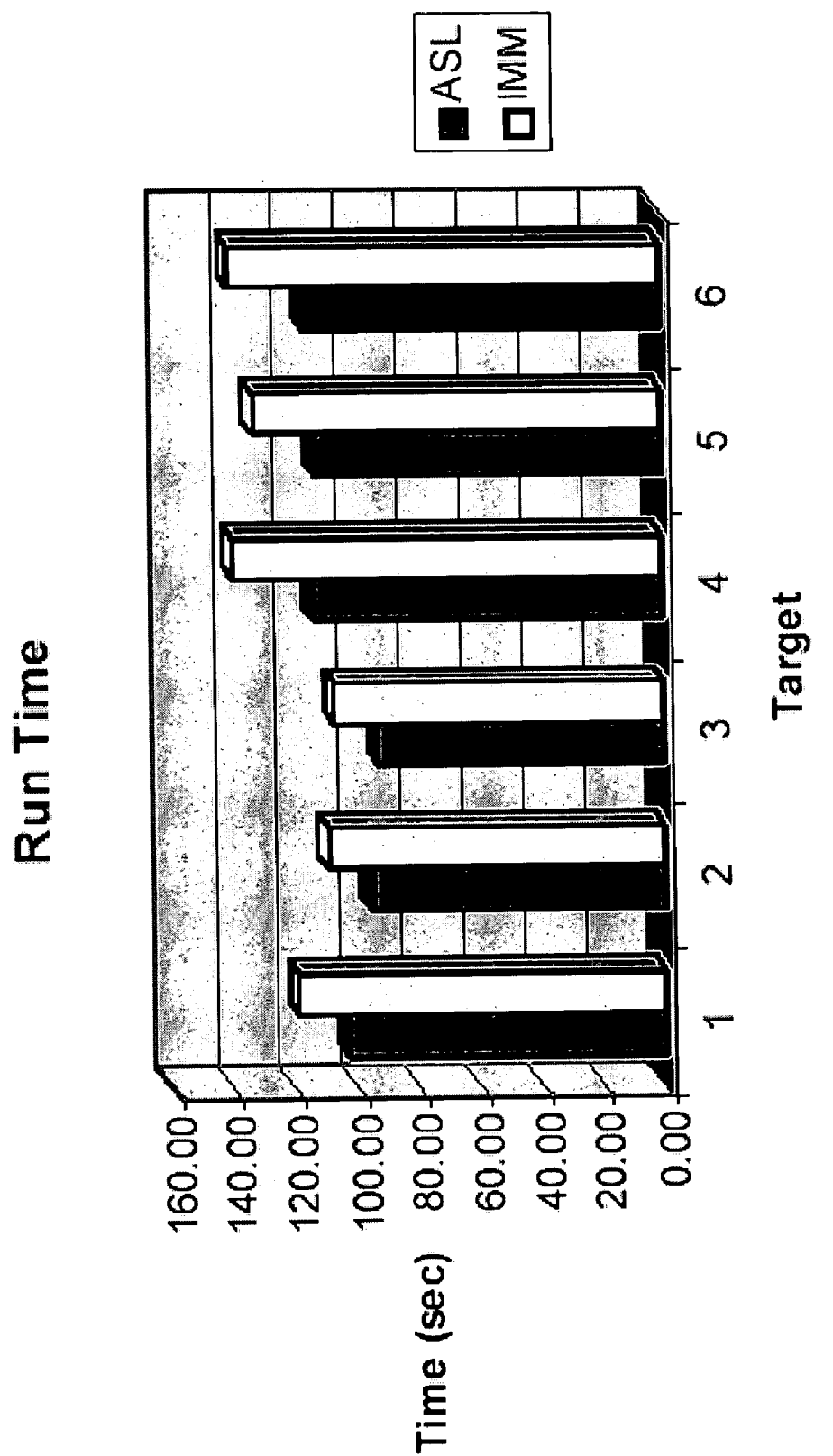
FIG. 23 depicts run time statistics for all target trajectories 1-6 comparing the run times of the fourth preferred embodiment according to the present invention depicted in FIG. 8 with the run times for the IMM radar filter system shown in FIG. 4A.

Moreover, in FIG. 22, all the RSE plots for the MM radar tracking filter 400 employing ASL have been combine into one figure to facilitate easy overall comparison. Clearly, the performance of the fourth preferred embodiment of the present invention architecture is comparable to that offered by the IMM filter 50 for the six trajectories shown. Stated another way, FIG. 22 shows the comparative performance of the MM radar tracking filter 400 with ASL versus that of the conventional IMM filter 50 for each of six target trajectories. The dark bar in each figure represents the performance statistics of the MM radar tracking filter 400 while the light colored bar to the immediate right shows the corresponding performance statistics of the IMM filter 50. The performance metric used is the average number of times that the RSE error for the MM radar tracking filter 400 is less than the IMM RSE. It will be noted that the comparative performance statistics are provided for filtered estimates of target position, velocity, and acceleration. From the FIG. 22, it will be appreciated that although the ASL switching logic is considerably less complex than that of the IMM filter, the performance statistics of the former is nevertheless comparable to the IMM filter 50 for all trajectories. As might be expected, the run time statistics, shown in FIG. 23, indicate that for the each trajectory, the run time for the MM radar tracking filter 400 with ASL represents an average 20% decrease in run time over that of the IMM filter 50.

In short, the removal of the Markov Switching Matrix (MSM) from the switching logic has removed a degree of ad-hoc design, which characterizes Multiple Model (MM) filters up to this point. This new design facilitates the implementation of MM radar tracking filters in combat systems by removing the considerable uncertainty about how to select values for the MSM.

Moreover, the evaluations and analysis discussed above were performed on alternative switching mechanisms for multiple model filters that do not require a MSM for their switching logic. For the Alternative Switching Logic (ASL) evaluated, the evidence shows that performance of, for example, the MM radar tracking filter 400 with ASL is comparable to that offered by the IMM filter 50 for the six NSWCDD Benchmark target trajectories.

Furthermore, the exemplary embodiments according to the present invention represent a first systematic attempt to consider alternative switching logic designs for multiple model filter structures that do not employ a Markov Switching Matrix in their design. It ill be appreciated that these exemplary embodiments do not constitute an exhaustive treatment of improved MM radar tracking filters; it is expected that one of ordinary skill in the art will appreciate that other switching logic designs departing from the Bayesian-based techniques employed in the MM radar tracking filters illustrated in FIGS. 5–8, such as fuzzy logic and neural networks, advantageously can also be employed.

Although presently preferred embodiments of the present invention have been described in detail herein above, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A multiple model (MM) radar tracking filter, comprising:
    a feed back loop for providing a feedback signal to respective inputs of first and second model functions responsive to weighted outputs of the first and second model functions, wherein the feedback loop provides a feedback signal based on a convex sum of a weighted estimate produced by the MM radar tracking filter, and the MM radar tracking filter controls a weighting to the weighted outputs of the first and second model functions that are responsive to non-Markovian switching logic.

2. A multiple model (MM) radar tracking filter, comprising:
a feed back loop for providing a feedback signal to respective inputs of first and second model functions responsive to weighted outputs of the first and second model functions,
wherein the feedback loop provides a feedback signal based on a convex sum of a weighted estimate and a weighted covariance produced by the MM radar tracking filter, and the MM radar tracking filter controls a weighting to the weighted outputs of the first and second model functions that are responsive to non-Markovian switching logic.

3. A multiple model (MM) radar tracking filter, comprising:
first and second model functions;
non-Markovian switching logic receiving unweighted outputs from the first and second model functions and generating first and second weighting signals;
first and second multipliers generating respective first and second weighted output signals responsive to received ones of the unweighted outputs of the first and second model functions and the first and second weighting signals; and
a feed back loop for providing feedback signals to respective inputs of the first and second model functions responsive to the weighted outputs of the first and second multipliers,
wherein the feedback loop provides a feedback signal based on a convex sum of a weighted estimate produced by the MM radar tracking filter.

4. A multiple model (MM) radar tracking filter, comprising:
first and second model functions;
non-Markovian switching logic receiving unweighted outputs from the first and second model functions and generating first and second weighting signals;
first and second multipliers generating respective first and second weighted output signals responsive to received ones of the unweighted outputs of the first and second model functions and the first and second weighting signals; and
a feed back loop for providing a feedback signal to respective inputs of the first and second model functions responsive to the weighted outputs of the first and second multipliers, wherein the feedback loop provides a feedback signal based on a convex sum of a weighted estimate and a weighted covariance produced by the MM radar tracking filter.

5. The MM radar tracking filter as recited in claim 4, wherein the MM radar tracking filter is disposed in a radar system.

6. The MM radar tracking filter as recited in claim 4, wherein the first and second model functions correspond to constant velocity and constant acceleration model functions, respectively.

7. A method for operating a multiple model (MM) radar tracking filter, comprising:
generating unweighted outputs from first and second model functions;
generating first and second weighting signals responsive to the unweighted outputs from the first and second model functions;
applying the weighting signals to the unweighted outputs responsive to non-Markovian switching logic;
generating first and second weighted output signals, respectively, in first and second multipliers responsive to received ones of the unweighted outputs of the first and second model functions and the first and second weighting signals; and
providing a feedback signal to respective inputs of the first and second model functions responsive to the first and second weighted output signals of the first and second multipliers,
wherein the feedback signal is based on a convex sum of a weighted estimate.

8. A method for operating a multiple model (MM) radar tracking filter which controls the weighting applied to outputs of first and second model functions responsive to non-Markovian switching logic, comprising:
generating unweighted outputs from first and second model functions;
generating first and second weighting signals responsive to the unweighted outputs from the first and second model functions;
applying the weighting signals to the unweighted outputs responsive to non-Markovian switching logic;
generating first and second weighted output signals, respectively, in first and second multipliers responsive to received ones of the unweighted outputs of the first and second model functions and the first and second weighting signals; and
providing a feedback signal to respective inputs of the first and second model functions responsive to the first and second weighted output signals of the first and second multipliers,
wherein the feedback signal is based on a convex sum of a weighted estimate and a weighted covariance.

9. The MM radar tracking filter as recited in claim 1, wherein the first and second model functions correspond to constant velocity and constant acceleration model functions, respectively.

10. The MM radar tracking filter as recited in claim 1, wherein the non-Markovian switching logic is an adaptive switching mechanism that employs Alternative Switching Logic.

11. The MM radar tracking filter as recited in claim 2, wherein the first and second model functions correspond to constant velocity and constant acceleration model functions, respectively.

12. The MM radar tracking filter as recited in claim 2, wherein the non-Markovian switching logic is an adaptive switching mechanism that employs Alternative Switching Logic.

13. The MM radar tracking filter as recited in claim 3, wherein the first and second model functions correspond to constant velocity and constant acceleration model functions, respectively.

14. The MM radar tracking filter as recited in claim 3, wherein the non-Markovian switching logic is an adaptive switching mechanism that employs Alternative Switching Logic.

15. The MM radar tracking filter as recited in claim 4, wherein the non-Markovian switching logic is an adaptive switching mechanism that employs Alternative Switching Logic.

16. The MM radar tracking filter as recited in claim 7, wherein the first and second model functions correspond to constant velocity and constant acceleration model functions, respectively.

17. The MM radar tracking filter as recited in claim 7, wherein the non-Markovian switching logic is an adaptive switching mechanism that employs Alternative Switching Logic.

18. The MM radar tracking filter as recited in claim 8, wherein the first and second model functions correspond to constant velocity and constant acceleration model functions, respectively.

19. The MM radar tracking filter as recited in claim 8, wherein the non-Markovian switching logic is an adaptive switching mechanism that employs Alternative Switching Logic.

* * * * *